(12) United States Patent
Murata et al.

(10) Patent No.: US 10,113,049 B2
(45) Date of Patent: Oct. 30, 2018

(54) THERMOPLASTIC RESIN COMPOSITION

(71) Applicant: NIPPON NYUKAZAI CO., LTD., Tokyo (JP)

(72) Inventors: Taku Murata, Kanagawa (JP); Yuta Saito, Kanagawa (JP); Taku Nakamura, Kanagawa (JP); Koichi Hotta, Kanagawa (JP)

(73) Assignee: NIPPON NYUKAZAI CO., LTD., Tokyo (JP)

( * ) Notice: Subject to any disclaimer, the term of this patent is extended or adjusted under 35 U.S.C. 154(b) by 0 days.

(21) Appl. No.: 14/381,044

(22) PCT Filed: Feb. 27, 2013

(86) PCT No.: PCT/JP2013/055179
§ 371 (c)(1),
(2) Date: Mar. 3, 2015

(87) PCT Pub. No.: WO2013/129489
PCT Pub. Date: Sep. 6, 2013

(65) Prior Publication Data
US 2015/0329698 A1    Nov. 19, 2015

(30) Foreign Application Priority Data

Feb. 29, 2012    (JP) ................... 2012-044284

(51) Int. Cl.
*C08K 3/30* (2006.01)
*C08G 65/334* (2006.01)
*C08K 5/41* (2006.01)
*C08L 71/02* (2006.01)

(52) U.S. Cl.
CPC ............ *C08K 3/30* (2013.01); *C08G 65/334* (2013.01); *C08G 65/3344* (2013.01); *C08K 5/41* (2013.01); *C08L 71/02* (2013.01); *C08K 2003/3054* (2013.01)

(58) Field of Classification Search
CPC ............... C08K 5/19; C08K 5/42; C09K 3/16
USPC ........................................................ 524/156
See application file for complete search history.

(56) References Cited

U.S. PATENT DOCUMENTS

| | | | |
|---|---|---|---|
| 2,810,703 A * | 10/1957 | Sims ........................ | C08K 5/19 524/157 |
| 3,336,410 A * | 8/1967 | Bloch ........................ | C07C 2/70 585/458 |
| 3,376,277 A * | 4/1968 | Seifert ....................... | C08K 5/42 260/DIG. 15 |
| 3,408,341 A * | 10/1968 | Joyner ....................... | C08K 5/0008 524/100 |
| 3,985,939 A * | 10/1976 | Kleber ....................... | C08K 5/42 524/159 |
| 4,113,679 A * | 9/1978 | Andrascheck ............ | C08K 5/19 260/DIG. 15 |

(Continued)

FOREIGN PATENT DOCUMENTS

| CN | 1227581 A | 9/1999 |
|---|---|---|
| CN | 1492902 | 4/2004 |

(Continued)

OTHER PUBLICATIONS

Machine translated English language equivalent of JP 06-228420 (Aug. 1994, 5 pages).*
Machine translated English language equivalent of JP 2007-191684 (Aug. 2007, 7 pages).*
International Search Report for PCT/JP2013/055179, dated Apr. 2, 2013, and English translation thereof.
International Preliminary Report on Patentability for PCT/JP2013/055179, dated Sep. 12, 2014, and English translation thereof.
Taiwanese Office Action, dated Feb. 24, 2015, in corresponding TW Application No. 102107095, and English translation thereof.

(Continued)

*Primary Examiner* — Alicia Bland
(74) *Attorney, Agent, or Firm* — Dickinson Wright PLLC

(57) ABSTRACT

[Problem] Provided is a thermoplastic resin composition excellent in weather resistance.
[Solution] A thermoplastic resin composition containing (a) a thermoplastic resin and (b) an ionically bonded salt represented by the following Chemical Formula (1) or (2):

[Chem. 1]

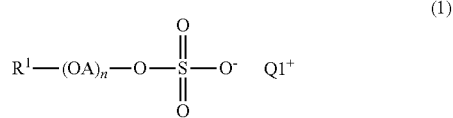

(1)

[Chem. 2]

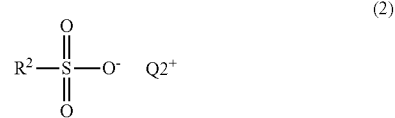

(2)

in the Chemical Formulae (1) and (2) above, $R^1$ and $R^2$ each independently represent a substituted or unsubstituted linear, branched, or cyclic alkyl group having from 1 to 30 carbon atoms, a substituted or unsubstituted aryl group having from 6 to 30 carbon atoms, or a substituted or unsubstituted arylalkyl group having from 7 to 31 carbon atoms, A is a linear or branched alkylene group having from 2 to 4 carbon atoms, n represents an integer of 0 to 50, Q1 and Q2 each independently represent at least one kind selected from the group consisting of an ammonium ion, an imidazolium ion, a pyridinium ion, a pyrrolidinium ion, a pyrrolinium ion, a piperidinium ion, a pyrazinium ion, a pyrimidinium ion, a triazolium ion, a triazinium ion, a quinolinium ion, an isoquinolinium ion, an indolinium ion, a quinoxalinium ion, a piperazinium ion, an oxazolinium ion, a thiazolinium ion, and a morpholinium ion.

9 Claims, No Drawings

(56) References Cited

U.S. PATENT DOCUMENTS

| | | | |
|---|---|---|---|
| 4,707,189 A * | 11/1987 | Nickol | A61K 8/416 |
| | | | 106/173.01 |
| 5,468,793 A * | 11/1995 | Ward | C08K 5/19 |
| | | | 524/158 |
| 6,124,428 A | 9/2000 | Schmieg et al. | |
| 2004/0054041 A1 | 3/2004 | Schmidt | |
| 2006/0100323 A1 | 5/2006 | Schmidt et al. | |
| 2008/0045636 A1 * | 2/2008 | Iyama | C08K 5/0025 |
| | | | 524/154 |

FOREIGN PATENT DOCUMENTS

| | | | |
|---|---|---|---|
| CN | 1681878 A | | 10/2005 |
| JP | 63-043972 | | 2/1988 |
| JP | 06228420 A | * | 8/1994 |
| JP | 2004-517185 | | 6/2004 |
| JP | 2007191684 A | * | 8/2007 |
| JP | 2009-249407 | | 10/2009 |
| JP | 2010-196007 | | 9/2010 |
| JP | 2012-072395 | | 4/2012 |

OTHER PUBLICATIONS

Chinese Office Action dated Dec. 3, 2015 that issue in the counterpart Patent Application No. 201380011815.3, including Eng. Translation.

TW Office Action dated Oct. 14, 2015, issued in corresponding Patent Application No. 102107095.

Chinese Office Action dated Jul. 19, 2016 which issued in a counterpart Patent Application No. 201380011815.3, including English translation.

Chinese Office Action dated Jan. 13, 2017 which issued in a counterpart Patent Application No. 201380011815.3, including English translation.

\* cited by examiner

THERMOPLASTIC RESIN COMPOSITION

TECHNICAL FIELD

The present invention relates to a thermoplastic resin composition.

BACKGROUND ART

In recent years, it has been more strongly desired to highly improve the durability of the polymeric materials used under harsh environments such as outdoors from the viewpoint of environmental impact reduction by reduction in the maintenance cost or resource saving.

Among them, use of water base paints has been expanded particularly in the field of paints in consideration of the global environment or the painting work environment. Hence, the performance required to the water base paints has also been increased, and water base paints having enhanced weather resistance have been proposed.

For example, a technique has been proposed in Patent Literature 1 in which weather resistance is improved by adding a nonreactive ultraviolet absorber having no unsaturated double bond in the molecule or a nonreactive hindered amine light stabilizer to the resin for paint.

CITATION LIST

Patent Literature

Patent Literature 1: JP 63-43972 A

SUMMARY OF INVENTION

Technical Problem

However, the technique disclosed in Patent Literature 1 has a problem that the weather resistance is insufficient.

Hence, an object of the invention is to provide a thermoplastic resin composition excellent in weather resistance.

Means for Solving Problem

The inventors have conducted intensive investigations in order to solve the problem above. As a result, they found out that a composition excellent in weather resistance can be obtained by blending a specific ionically bonded salt with a thermoplastic resin, and thus completed the invention.

In other words, the invention is a thermoplastic resin composition containing (a) a thermoplastic resin and (b) an ionically bonded salt represented by the following Chemical Formula (1) or (2).

[Chem. 1]

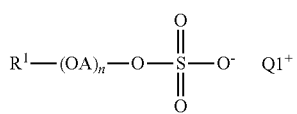

(1)

[Chem. 2]

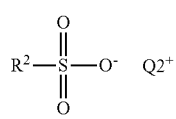

(2)

In the Chemical Formulae (1) and (2) above, $R^1$ and $R^2$ each independently represent a substituted or unsubstituted linear, branched, or cyclic alkyl group having from 1 to 30 carbon atoms, a substituted or unsubstituted aryl group having from 6 to 30 carbon atoms, or a substituted or unsubstituted arylalkyl group having from 7 to 31 carbon atoms, A is a linear or branched alkylene group having from 2 to 4 carbon atoms, n represents an integer of 0 to 50, Q1 and Q2 each independently represent at least one kind selected from the group consisting of an ammonium ion, an imidazolium ion, a pyridinium ion, a pyrrolidinium ion, a pyrrolinium ion, a piperidinium ion, a pyrazinium ion, a pyrimidinium ion, a triazolium ion, a triazinium ion, a quinolinium ion, an isoquinolinium ion, an indolinium ion, a quinoxalinium ion, a piperazinium ion, an oxazolinium ion, a thiazolinium ion, and a morpholinium ion.

Advantageous Effect of the Invention

According to the invention, a thermoplastic resin composition excellent in weather resistance can be obtained.

DESCRIPTION OF EMBODIMENTS

The invention is a thermoplastic resin composition containing (a) a thermoplastic resin and (b) an ionically bonded salt represented by the following Chemical Formulae (1) or (2).

[Chem. 3]

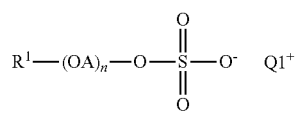

(1)

[Chem. 4]

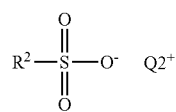

(2)

In the Chemical Formulae (1) and (2) above, $R^1$ and $R^2$ each independently represent a substituted or unsubstituted linear, branched, or cyclic alkyl group having from 1 to 30 carbon atoms, a substituted or unsubstituted aryl group having from 6 to 30 carbon atoms, or a substituted or unsubstituted arylalkyl group having from 7 to 31 carbon atoms, A is a linear or branched alkylene group having from 2 to 4 carbon atoms, n represents an integer of 0 to 50, Q1 and Q2 each independently represent at least one kind selected from the group consisting of an ammonium ion, an imidazolium ion, a pyridinium ion, a pyrrolidinium ion, a pyrrolinium ion, a piperidinium ion, a pyrazinium ion, a pyrimidinium ion, a triazolium ion, a triazinium ion, a quinolinium ion, an isoquinolinium ion, an indolinium ion, a quinoxalinium ion, a piperazinium ion, an oxazolinium ion, a thiazolinium ion, and a morpholinium ion.

Hereinafter, the configuration of the thermoplastic resin composition of the invention will be described in detail.

[(a) Thermoplastic Resin]

The (a) thermoplastic resin used in the invention is not particularly limited, but examples thereof may include a (meth)acrylic resin, a styrene resin, an olefin resin (including a cyclic olefin resin), a polyester resin, a polycarbonate resin, a polyamide resin, a polyphenylene ether resin, a polyphenylene sulfide resin, a halogen-containing resin (polyvinyl chloride, polyvinylidene chloride, fluororesin, or the like), a polysulfone resin (polyethersulfone, polysulfone, or the like), a cellulose derivative (a cellulose ester, a cellulose carbamate, a cellulose ether, or the like), a silicone resin (polydimethylsiloxane, polymethylphenylsiloxane, or the like), a polyvinyl ester resin such as polyvinyl acetate, a polyvinyl alcohol resin and a derivative resin thereof, and a rubber or an elastomer (a diene rubber such as polybutadiene and polyisoprene, a styrene-butadiene copolymer, an acrylonitrile-butadiene copolymer, an acrylonitrile-butadiene-styrene copolymer (ABS resin), an acrylic rubber, a urethane rubber, a silicone rubber, or the like). The thermoplastic resins above can be used singly or in combination of two or more kinds thereof.

Specific examples of the (meth)acrylic resin may include (meth)acrylic acid, a (meth)acrylic acid ester [a (meth) acrylic acid alkyl ester having an alkyl group having from 1 to 10 carbon atoms such as methyl (meth)acrylate, ethyl (meth)acrylate, propyl (meth)acrylate, butyl (meth)acrylate, and 2-ethylhexyl (meth)acrylate; a (meth)acrylic acid hydroxyalkyl such as hydroxyethyl (meth)acrylate; a (meth) acrylic acid glycidyl ester; or the like], a homopolymer or copolymer of a (meth)acrylic monomer such as (meth) acrylonitrile; and a copolymer of a (meth)acrylic monomer and another monomer.

Specific examples of the homopolymer or copolymer of a (meth)acrylic monomer may include a poly(meth)acrylic acid ester, an acrylic acid ester-methacrylic acid ester copolymer, and polyacrylonitrile. Specific examples of the copolymer of a (meth)acrylic monomer and another monomer may include a (meth)acrylic acid-styrene copolymer, a (meth)acrylic acid ester-styrene copolymer, a (meth)acrylic acid ester-(meth)acrylic acid-styrene copolymer, an acrylonitrile-butadiene-styrene copolymer, an acrylonitrile-styrene copolymer, an acrylonitrile-styrene-(meth)acrylic acid ester copolymer, an acrylonitrile-acrylic acid ester-styrene copolymer (AAS resin), and a methyl methacrylate-butadiene-styrene copolymer (MBS resin).

Specific examples of the styrene resin may include polystyrene, poly-α-methylstyrene, an α-methylstyrene-acrylonitrile copolymer, a styrene-N-phenylmaleimide copolymer, a styrene-N-phenylmaleimide-acrylonitrile copolymer, and a rubber-reinforced polystyrene resin (HIPS resin).

As the olefin resin, a copolymer of an olefin monomer, a copolymer of an olefin monomer and another copolymerizable monomer in addition to a homopolymer of an olefin monomer may be included. Specific examples of the olefin monomer may include a chain olefin [an α-olefin having from 2 to 20 carbon atoms such as ethylene, propylene, 1-butene, isobutene, 1-pentene, 4-methyl-1-pentene, 1-hexene, 1-octene, 1-decene, or the like] and a cyclic olefin [for example, a cycloalkene having from 4 to 10 carbon atoms such as cyclopentene; a cycloalkadiene having from 4 to 10 carbon atoms such as cyclopentadiene; a bicycloalkene having from 7 to 20 carbon atoms or a bicycloalkadiene having from 7 to 20 carbon atoms such as norbornene and norbornadiene; and a tricycloalkene having from 10 to 25 carbon atoms or a tricycloalkadiene such as dihydrodicyclopentadiene and dicyclopentadiene]. These olefin monomers can be used singly or in combination of two or more kinds thereof. Among the olefin monomers above, a chain olefin such as an α-olefin having from 2 to 4 carbon atoms including ethylene, propylene, and 1-butene is preferable.

Specific examples of another copolymerizable monomers copolymerizable with the olefin monomer may include a fatty acid vinyl ester such as vinyl acetate and vinyl propionate; a (meth)acrylic monomer such as (meth)acrylic acid, an alkyl (meth)acrylate, and glycidyl (meth)acrylate; an unsaturated dicarboxylic acid or an anhydride thereof such as maleic acid, fumaric acid, and maleic anhydride; a vinyl ester of a carboxylic acid (for example, vinyl acetate, vinyl propionate, or the like); a cyclic olefin such as norbornene and cyclopentadiene; and a diene such as butadiene and isoprene. These copolymerizable monomers may be used singly or in combination of two or more kinds thereof.

More specific examples of the olefin resin may include polyethylene (low density polyethylene, medium density polyethylene, high density polyethylene, linear low density polyethylene, or the like), polypropylene (homo polypropylene, block polypropylene, random polypropylene, or the like), and a (co)polymer of a chain olefin (particularly an α-olefin having from 2 to 4 carbon atoms) such as a terpolymer including an ethylene-propylene copolymer and an ethylene-propylene-butene-1. In addition, specific examples of the copolymer of an olefin monomer and another copolymerizable monomer may include a copolymer (for example, an ethylene-vinyl acetate copolymer, an ethylene-vinyl propionate copolymer, or the like) of a chain olefin (particularly an α-olefin having from 2 to 4 carbon atoms such as ethylene and propylene) and a fatty acid vinyl ester monomer; a copolymer [a copolymer (for example, an ethylene-(meth)acrylic acid copolymer, a propylene-(meth) acrylic acid copolymer, ionomer, or the like) of a chain olefin (particularly an α-olefin having from 2 to 4 carbon atoms) and (meth)acrylic acid; a copolymer (for example, an ethylene-alkyl (meth)acrylate copolymer, or the like) of a chain olefin (particularly an α-olefin having from 2 to 4 carbon atoms) and an alkyl (meth)acrylate; or the like] of a chain olefin and a (meth)acrylic monomer; a copolymer (for example, an ethylene-butadiene copolymer, or the like) of a chain olefin (particularly an α-olefin having from 2 to 4 carbon atoms) and a diene; a modified polyolefin such as an epoxy-modified polyolefin (for example, an ethylene-glycidyl (meth)acrylate copolymer), a carboxy-modified polyolefin (for example, an ethylene-maleic anhydride copolymer), and an epoxy and carboxy-modified polyolefin (for example, an ethylene-maleic anhydride-glycidyl (meth) acrylate copolymer); and an olefin elastomer (an ethylene-propylene rubber, or the like).

Specific examples of the polyester resin may include a polymer or a copolymer obtained through the polycondensation of at least one kind selected from the group consisting of (i) a dicarboxylic acid or a derivative thereof and a diol or a derivative thereof, (ii) a hydroxy carboxylic acid or a derivative thereof, and (iii) a lactone.

Examples of the dicarboxylic acid or the derivative thereof may include an aromatic dicarboxylic acid such as terephthalic acid, isophthalic acid, phthalic acid, 2,6-naphthalenedicarboxylic acid, 1,5-naphthalen dicarboxylic acid, bis(p-carboxyphenyl)methane, anthracenedicarboxylic acid, 4,4'-diphenyl ether dicarboxylic acid, 5-tetrabutylphosphoniumisophthalic acid, and 5-sodiosulfoisophthalic acid, an aliphatic dicarboxylic acid such as oxalic acid, succinic acid, adipic acid, sebacic acid, azelaic acid, dodecanedioic acid, malonic acid, glutaric acid, and dimer acid, 1,3-cyclohexanedicarboxylic acid, and 1,4-cyclohexanedicarboxylic acid. Examples of the diol or the derivative thereof may include an aliphatic glycol having from 2 to 20 carbon atoms, that is, ethylene glycol, propylene glycol, 1,4-butanediol, neopentyl glycol, 1,5-pentanediol, 1,6-hexanediol, decamethylene glycol, cyclohexane dimethanol, cyclohexane diol, dimer diol, or the like, or a long chain glycol having a molecular weight of from 200 to 100,000, that is, polyethylene glycol, poly-1,3-propylene glycol, polytetramethylene glycol, or the like, an aromatic dioxy compound, that is, 4,4'-dihydroxybiphenyl, hydroquinone, t-butylhydroquinone, bisphenol A, bisphenol S, bisphenol F, or the like, and a derivative thereof. Examples of the hydroxy carboxylic acid may include glycolic acid, lactic acid, hydroxypropionic acid, hydroxybutyric acid, hydroxyvaleric acid, hydroxycaproic acid, hydroxybenzoic acid, p-hydroxybenzoic acid, 6-hydroxy-2-naphthoic acid, and a derivative thereof. Examples of the lactone may include caprolactone, valerolactone, propiolactone, undecalactone, 1,5-oxepane-2-one. In addition, a polyester elastomer is also included in the polyester resin.

Specific examples of a polycarbonate resin may include a thermoplastic resin obtained through the reaction of a di- or higher valent phenolic compound with a carbonic acid diester compound such as phosgene or diphenyl carbonate.

Examples of the di- or higher valent phenolic compound may include a dihydroxydiarylalkane such as 2,2-bis(4-hydroxyphenyl)propane (commonly called as bisphenol A), bis(4-hydroxyphenyl)methane, bis(4-hydroxyphenyl)phenyl methane, bis(4-hydroxyphenyl)naphthyl methane, bis(4-hydroxyphenyl)-(4-isopropylphenyl)methane, bis(3,5-dichloro-4-hydroxyphenyl)methane, bis(3,5-dimethyl-4-hydroxyphenyl)methane, 1,1-bis(4-hydroxyphenyl)ethane, 1-naphthyl-1,1-bis(4-hydroxyphenyl)ethane, 1-phenyl-1,1-bis(4-hydroxyphenyl)ethane, 1,2-bis(4-hydroxyphenyl)ethane, 2-methyl-1,1-bis(4-hydroxyphenyl)propane, 2,2-bis(3,5-dimethyl-4-hydroxyphenyl)propane, 1-ethyl-1,1-bis(4-hydroxyphenyl)propane, 2,2-bis(3,5-dichloro-4-hydroxyphenyl)propane, 2,2-bis(3,5-dibromo-4-hydroxyphenyl)propane, 2,2-bis(3-chloro-4-hydroxyphenyl)propane, 2,2-bis(3-methyl-4-hydroxyphenyl)propane, 2,2-bis(3-fluoro-4-hydroxyphenyl)propane, 1,1-bis(4-hydroxyphenyl)butane, 2,2-bis(4-hydroxyphenyl)butane, 1,4-bis(4-hydroxyphenyl)butane, 2,2-bis(4-hydroxyphenyl)pentane, 4-methyl-2,2-bis(4-hydroxyphenyl)pentane, 2,2-bis(4-hydroxyphenyl)hexane, 4,4-bis(4-hydroxyphenyl)heptane, 2,2-bis(4-hydroxyphenyl)nonane, 1,10-bis(4-hydroxyphenyl)decane, 1,1-bis(4-hydroxyphenyl)-3,3,5-trimethyl cyclohexane, and 2,2-bis(4-hydroxyphenyl)-1,1,1,3,3,3-hexafluoropropane, a dihydroxydiaryl cycloalkane such as 1,1-bis(4-hydroxyphenyl)cyclohexane, 1,1-bis(3,5-dichloro-4-hydroxyphenyl)cyclohexane, and 1,1-bis(4-hydroxyphenyl)cyclodecane, a dihydroxydiaryl sulfone such as bis(4-hydroxyphenyl)sulfone, bis(3,5-dimethyl-4-hydroxyphenyl)sulfone, and bis(3-chloro-4-hydroxyphenyl)sulfone, a dihydroxyaryl ether such as bis(4-hydroxyphenyl) ether and bis(3,5-dimethyl-4-hydroxyphenyl) ether, a dihydroxydiaryl ketone such as 4,4'-dihydroxybenzophenone and 3,3',5,5'-tetramethyl-4,4'-dihydroxybenzophenone, a dihydroxydiaryl sulfide such as bis(4-hydroxyphenyl) sulfide, bis(3-methyl-4-hydroxyphenyl) sulfide, and bis(3,5-dimethyl-4-hydroxyphenyl) sulfide, a dihydroxydiaryl sulfoxide such as bis(4-hydroxyphenyl) sulfoxide, a dihydroxydiphenyl such as 4,4'-dihydroxydiphenyl, and a dihydroxyaryl fluorene such as 9,9-bis(4-hydroxyphenyl)fluorene. In addition, a dihydroxybenzene such as hydroquinone, resorcinol, and methylhydroquinone, and a dihydroxynaphthalene such as 1,5-dihydroxynaphthalene and 2,6-dihydroxynaphthalene other than the divalent phenol compounds described above can be used as the divalent phenol compound.

These di- or higher valent phenol compounds may be used singly or in combination of two or more kinds thereof. In addition, a linear aliphatic dicarboxylic acid such as adipic acid, pimelic acid, suberic acid, azelaic acid, sebacic acid, and decane dicarboxylic acid may be used as a copolymerization component.

Specific examples of a polyamide resin may include an aliphatic polyamide such as polyamide 46, polyamide 5, polyamide 6, polyamide 66, polyamide 610, polyamide 612, polyamide 11, polyamide 12, polyamide 6/66, and polyamide 6/11; an alicyclic polyamide such as poly-1,4-norbornene terephthalamide, poly-1,4-cyclohexane terephthalamide, and poly-1,4-cyclohexane-1,4-cyclohexaneamide; an aromatic polyamide such as polyamide 6T, polyamide 9T, and polyamide MXD; and a copolyamide formed by at least two different kinds of polyamide-forming components among these polyamides. Meanwhile, a polyamide elastomer is also included in the polyamide resin.

Specific examples of a polyphenylene ether resin may include a homopolymer such as poly(2,5-dimethyl-1,4-phenylene ether), poly(2,6-dimethyl-1,4-phenylene ether), poly(2-methyl-6-ethyl-1,4-phenylene ether), poly(2,6-di-n-propyl-1,4-phenylene ether), and poly(2-methyl-6-chloroethyl-1,4-phenylene ether), a modified polyphenylene ether copolymer constituted by having these homopolymers as a base, and a modified graft copolymer in which a styrene polymer is grafted to a polyphenylene ether homopolymer or a copolymer thereof.

Specific examples of a polyphenylene sulfide resin may include a polyphenylene sulfide, a polyphenylene sulfide ketone, a polybiphenylene sulfide, and a polyphenylene sulfide sulfone.

Meanwhile, the form of the copolymer may be any of a block copolymer, a random copolymer, a graft copolymer, and an alternating copolymer in a case in which the thermoplastic resin described above is a copolymer.

A synthetic compound or a commercially available product may be used as the thermoplastic resin described above. The polymerization method for the synthesis of these thermoplastic resins is not particularly limited, and a known method can be used. Examples thereof may include a high-pressure radical polymerization method, a medium/low-pressure polymerization method, a solution polymerization method, a slurry polymerization method, a bulk polymerization method, an emulsion polymerization method, and a vapor phase polymerization method. In addition, the catalyst used in the polymerization is also not particularly limited, and examples thereof may include a peroxide catalyst, the Ziegler-Natta catalyst, and a metallocene catalyst.

The (a) thermoplastic resin described above is preferably at least one kind selected from the group consisting of a (meth)acrylic resin, a styrene resin, an olefin resin, a polyester resin, and an acrylonitrile-butadiene-styrene copolymer (ABS resin).

[(b) Ionically Bonded Salt]

The (b) ionically bonded salt (hereinafter, also simply referred to as the component (b)) used in the invention is a compound represented by the Chemical Formula (1) above or the Chemical Formula (2) above. The ionically bonded salt may be used singly or in combination of two or more kinds thereof.

In the Chemical Formulae (1) and (2) above, $R^1$ and $R^2$ each independently represent a substituted or unsubstituted linear, branched, or cyclic alkyl group having from 1 to 30 carbon atoms, a substituted or unsubstituted aryl group having from 6 to 30 carbon atoms, or a substituted or unsubstituted arylalkyl group having from 7 to 31 carbon atoms, A is a linear or branched alkylene group having from 2 to 4 carbon atoms, n represents an integer of 0 to 50, Q1 and Q2 each independently represent at least one kind selected from the group consisting of an ammonium ion, an imidazolium ion, a pyridinium ion, a pyrrolidinium ion, a pyrrolinium ion, a piperidinium ion, a pyrazinium ion, a pyrimidinium ion, a triazolium ion, a triazinium ion, a quinolinium ion, an isoquinolinium ion, an indolinium ion, a quinoxalinium ion, a piperazinium ion, an oxazolinium ion, a thiazolinium ion, and a morpholinium ion.

Specific examples of the substituted or unsubstituted linear, branched, or cyclic alkyl group having from 1 to 30 carbon atoms which can be used as $R^1$ and $R^2$ in the Chemical Formulae (1) and (2) above may include a methyl group, an ethyl group, a n-propyl group, an isopropyl group, a n-butyl group, an isobutyl group, a sec-butyl group, a tert-butyl group, a n-pentyl group, an isoamyl group, a tert-pentyl group, a neopentyl group, a n-hexyl group, a 3-methylpentan-2-yl group, a 3-methylpentan-3-yl group, a 4-methylpentyl group, a 4-methylpentan-2-yl group, a 1,3-dimethylbutyl group, a 3,3-dimethylbutyl group, a 3,3-dimethylbutan-2-yl group, a n-heptyl group, a 1-methylhexyl group, a 3-methylhexyl group, a 4-methylhexyl group, a 5-methylhexyl group, a 1-ethylpentyl group, a 1-(n-propyl) butyl group, a 1,1-dimethylpentyl group, a 1,4-dimethylpentyl group, a 1,1-diethylpropyl, a 1,3,3-trimethylbutyl group, a 1-ethyl-2,2-dimethylpropyl group, a n-octyl group, a 2-methylhexan-2-yl group, a 2,4-dimethylpentan-3-yl group, a 1,1-dimethylpentan-1-yl group, a 2,2-dimethylhexan-3-yl group, a 2,3-dimethylhexan-2-yl group, a 2,5-dimethylhexan-2-yl group, a 2,5-dimethylhexan-3-yl group, a 3,4-dimethylhexan-3-yl group, a 3,5-dimethylhexan-3-yl group, a 1-methylheptyl group, a 2-methylheptyl group, a 5-methylheptyl group, a 2-methylheptan-2-yl group, a 3-methylheptan-3-yl group, a 4-methylheptan-3-yl group, a 4-methylheptan-4-yl group, a 1-ethylhexyl group, a 2-ethylhexyl group, a 1-propylpentyl group, a 2-propylpentyl group, a 1,1-dimethylhexyl group, a 1,4-dimethylhexyl, a 1,5-dimethylhexyl group, a 1-ethyl-1-methylpentyl group, a 1-ethyl-4-methylpentyl group, a 1,1,4-trimethylpentyl group, a 2,4,4-trimethylpentyl group, a 1-isopropyl-1,2-dimethylpropyl group, a 1,1,3,3-tetramethylbutyl group, a n-nonyl group, a 1-methyloctyl group, a 6-methyloctyl group, a 1-ethylheptyl group, a 1-(n-butyl)pentyl group, a 4-methyl-1-(n-propyl)pentyl group, a 1,5,5-trimethylhexyl group, a 1,1,5-trimethylhexyl group, a 2-methyloctan-3-yl group, a n-decyl group, a 1-methylnonyl group, a 1-ethyl-octyl group, a 1-(n-butyl)hexyl group, a 1,1-dimethyloctyl group, a 3,7-dimethyloctyl group, a n-undecyl group, a 1-methyldecyl group, a 1-ethylnonyl group, a n-dodecyl group, a n-tridecyl group, a n-tetradecyl group, a 1-methyltridecyl group, a n-pentadecyl group, a n-hexadecyl group, a n-heptadecyl group, a n-octadecyl group, a n-nonadecyl group, a n-eicosyl group, a cyclopropyl group, a cyclobutyl group, a cyclopentyl group, a cyclohexyl group, and a cyclooctyl group. A substituted or unsubstituted linear or branched alkyl group having from 1 to 8 carbon atoms is preferable from the viewpoint of easy availability, and a methyl group or a 1,2-bis(2-ethylhexyloxycarbonyl)ethyl group is particularly preferable.

Examples of the substituted or unsubstituted aryl group having from 6 to 30 carbon atoms which can be used as $R^1$ and $R^2$ in the Chemical Formulae (1) and (2) above may include a phenyl group, a biphenyl group, a 1-naphthyl group, a 2-naphthyl group, a 9-anthryl group, a 9-phenanthryl group, a 1-pyrenyl group, a 5-naphthacenyl group, a 1-indenyl group, a 2-azulenyl group, a 9-fluorenyl group, a terphenyl group, a quarterphenyl group, a mesityl group, a pentalenyl group, a binaphthalenyl group, a ternaphthalenyl group, a heptalenyl group, a biphenylenyl group, an indacenyl group, a fluoranthenyl group, an acenaphthylenyl group, an aceanthrylenyl group, a phenalenyl group, a fluorenyl group, an anthryl group, a bianthracenyl group, an anthraquinolyl group, a phenanthryl group, a triphenylenyl group, a pyrenyl group, a chrysenyl group, a naphthacenyl group, a pleiadenyl group, a picenyl group, a perylenyl group, a pentaphenyl group, a pentacenyl group, a tetraphenylenyl group, a hexaphenyl group, a hexacenyl group, a rubicenyl group, a coronenyl group, a trinaphthylenyl group, a heptaphenyl group, a heptacenyl group, a pyranthrenyl group, and an ovalenyl group. A substituted or unsubstituted aryl group having from 8 to 18 carbon atoms is preferable and a dimethylphenyl group (a 2,3-dimethylphenyl group, a 2,4-dimethylphenyl group, a 3,4-dimethylphenyl group, or the like), an isopropylphenyl group (a 2-isopropylphenyl group, a 3-isopropylphenyl group, and a 4-isopropylphenyl group), or a dodecylphenyl group (a 2-dodecylphenyl group, a 3-dodecylphenyl group, and a 4-dodecyl phenyl group) is particularly preferable from the viewpoint of easy availability.

Examples of the substituted or unsubstituted arylalkyl group having from 7 to 31 carbon atoms which can be used as $R^1$ and $R^2$ in the Chemical Formula (1) above may include a benzyl group, a phenylethyl group, a 3-phenylpropyl group, a 1-naphthylmethyl, a 2-naphthylmethyl group, a 2-(1-naphthyl)ethyl group, a 2-(2-naphthyl)ethyl group, a 3-(1-naphthyl)propyl group, or a 3-(2-naphthyl)propyl group.

Examples of the linear or branched alkylene group having from 2 to 4 carbon atoms which can be used as A in the Chemical Formula (1) above may include an ethylene group, a propylene group, and a butylene group. An ethylene group or a propylene group is particularly preferable from the viewpoint of easy availability.

A hydrogen atom in the substituted or unsubstituted linear, branched, or cyclic alkyl group having from 1 to 30 carbon atoms, the substituted or unsubstituted aryl group having from 6 to 30 carbon atoms, the substituted or unsubstituted arylalkyl group having from 7 to 31 carbon atoms, and the linear or branched alkylene group having from 2 to 4 carbon atoms may be further substituted with another substituent.

Examples of such a substituent may include a hydroxyl group, a carboxyl group, a formyl group, a mercapto group, a sulfo group, a mesyl group, p-toluenesulfonyl group, an amino group, a nitro group, a cyano group, a trifluoromethyl group, a trichloromethyl group, a trimethylsilyl group, a phosphinico group, and a phosphono group in addition to a halogen such as fluorine, chlorine, bromine, and iodine, an alkyl group such as a methyl group, an ethyl group, a tert-butyl group, and a dodecyl group, an aryl such as a phenyl group, a p-tolyl group, a xylyl group, a cumenyl group, a naphthyl group, an anthryl group, and a phenanthryl group, an alkoxy group such as a methoxy group, an ethoxy group, and a tert-butoxy group, an aryloxy group such as a phenoxy group and a p-tolyloxy group, an alkoxycarbonyl group such as a methoxycarbonyl group, a butoxycarbonyl group, 2-ethylhexyloxycarbonyl group, and a phenoxycarbonyl group, an acyloxy group such as an acetoxy group, a propionyloxy group, and a benzoyloxy group, an acyl group such as an acetyl group, a benzoyl group, an isobutyryl group, an acryloyl group, a methacryloyl group, and a methoxalyl group, an alkylsulfanyl group such as methylsulfanyl group and a tert-butylsulfanyl group, an arylsulfanyl group such as a phenylsulfanyl group and a p-tolylsulfanyl group, an alkylamino group such as a methylamino group and a cyclohexylamino group, a dialkylamino group such as a dimethylamino group, a diethylamino group, a morpholino group, and a piperidino group, an arylamino group such as a phenylamino group and a p-tolylamino group.

n in the Chemical Formula (1) above represents an integer of 0 to 50. n is preferably an integer of 1 to 50 and more preferably an integer of 5 to 50 from the viewpoint of ease of handling due to a decrease in viscosity or interfacial properties.

Examples of the cation represented by Q1 and Q2 in the Chemical Formula (1) above may include at least one kind selected from the group consisting of an ammonium ion, an imidazolium ion, a pyridinium ion, a pyrrolidinium ion, a pyrrolinium ion, a piperidinium ion, a pyrazinium ion, a pyrimidinium ion, a triazolium ion, a triazinium ion, a quinolinium ion, an isoquinolinium ion, an indolinium ion, a quinoxalinium ion, a piperazinium ion, an oxazolinium ion, a thiazolinium ion, and a morpholinium ion.

Specific examples of the ammonium ion may include the following ions. For example, an alkylammonium ion such as a dimethylammonium ion, a trimethylammonium ion, a tetramethylammonium ion, a diethylammonium ion, a triethylammonium ion, a tetraethylammonium ion, a monopropylammonium ion, a dipropylammonium ion, a tripropylammonium ion, a tetrapropylammonium ion, a monobutylammonium ion, a dibutylammonium ion, a tributylammonium ion, a tetrabutylammonium ion, a monopentylammonium ion, a dipentylammonium ion, a tripentylammonium ion, a tetrapentylammonium ion, a monohexylammonium ion, a dihexylammonium ion, a monoheptylammonium ion, a diheptylammonium ion, a monooctylammonium ion, a dioctylammonium ion, a monononylammonium ion, a monodecylammonium ion, a monoundecylammonium ion, a monododecylammonium ion, a monotridecylammonium ion, a monotetradecylammonium ion, a monopentadecylammonium ion, a monohexadecylammonium ion, a monoheptadecylammonium ion, a monooctadecylammonium ion, a mononenadecylammonium ion, a monoicosylammonium ion, a monohenicosylammonium ion, a monodocosylammonium ion, a monotricocylammonium ion, a methyl(ethyl)ammonium ion, a methyl(propyl)ammonium ion, a methyl(butyl)ammonium ion, a methyl(pentyl)ammonium ion, a methyl(hexyl)ammonium ion, a methyl(heptyl)ammonium ion, a methyl(octyl)ammonium ion, a methyl(nonyl)ammonium ion, a methyl(decyl)ammonium ion, a methyl(undecyl)ammonium ion, a methyl(dodecyl)ammonium ion, a methyl(tridecyl)ammonium ion, a methyl(tetradecyl)ammonium ion, a methyl(pentadecyl)ammonium ion, a methyl(hexadecyl)ammonium ion, a methyl(heptadecyl)ammonium ion, a methyl(octadecyl)ammonium ion, a methyl(nonadecyl)ammonium ion, a methyl(icosyl)ammonium ion, a methyl(henicosyl)ammonium ion, a methyl(tricosyl)ammonium ion, an ethyl(propyl)ammonium ion, an ethyl(butyl)ammonium ion, an ethyl(pentyl)ammonium ion, an ethyl(hexyl)ammonium ion, an ethyl(heptyl)ammonium ion, an ethyl(octyl)ammonium ion, an ethyl(nonyl)ammonium ion, an ethyl(decyl)ammonium ion, an ethyl(undecyl)ammonium ion, an ethyl(dodecyl)ammonium ion, an ethyl(tridecyl)ammonium ion, an ethyl(tetradecyl)ammonium ion, an ethyl(pentadecyl)ammonium ion, an ethyl(hexadecyl)ammonium ion, an ethyl(heptadecyl)ammonium ion, an ethyl(octadecyl)ammonium ion, an ethyl(nonadecyl)ammonium ion, an ethyl(icosyl)ammonium ion, an ethyl(henicosyl)ammonium ion, an ethyl(tricosyl)ammonium ion, a dimethyl(ethyl)ammonium ion, a dimethyl(propyl)ammonium ion, a dimethyl(butyl)ammonium ion, a dimethyl(pentyl)ammonium ion, a dimethyl(hexyl)ammonium ion, a dimethyl(heptyl)ammonium ion, a dimethyl(octyl)ammonium ion, a dimethyl(nonyl)ammonium ion, a dimethyl(decyl)ammonium ion, a dimethyl(undecyl)ammonium ion, a dimethyl(dodecyl)ammonium ion, a dimethyl(tridecyl)ammonium ion, a dimethyl(tetradecyl)ammonium ion, a dimethyl(pentadecyl)ammonium ion, a dimethyl(hexadecyl)ammonium ion, a dimethyl(heptadecyl)ammonium ion, a dimethyl(octadecyl)ammonium ion, a dimethyl(nonadecyl)ammonium ion, a dimethyl(icosyl)ammonium ion, a dimethyl(henicosyl)ammonium ion, a dimethyl(tricosyl)ammonium ion, a trimethyl(ethyl)ammonium ion, a trimethyl(propyl)ammonium ion, a trimethyl(butyl)ammonium ion, a trimethyl(pentyl)ammonium ion, a trimethyl(hexyl)ammonium ion, a trimethyl(heptyl)ammonium ion, a trimethyl(octyl)ammonium ion, a trimethyl(nonyl)ammonium ion, a trimethyl(decyl)ammonium ion, a trimethyl(undecyl)ammonium ion, a trimethyl(dodecyl)ammonium ion, a trimethyl(tridecyl)ammonium ion, a trimethyl(tetradecyl)ammonium ion, a trimethyl(pentadecyl)ammonium ion, a trimethyl(hexadecyl)ammonium ion, trimethyl(heptadecyl) ammonium ion, a trimethyl(octadecyl)ammonium ion, a trimethyl(nonadecyl)ammonium ion, a trimethyl(icosyl)ammonium ion, a trimethyl(henicosyl)ammonium ion, and a trimethyl(tricosyl)ammonium ion.

An aromatic substituted alkyl ammonium ion such as a monobenzylammonium ion, a (1-phenethyl)ammonium ion, a (2-phenethyl)ammonium ion (another name: monophenethylammonium ion), a dibenzylammonium ion, a bis(1-phenethyl)ammonium ion, and a bis(2-phenethyl)ammonium ion (another name: diphenethylammonium ion); a cycloalkylammonium ion having from 5 to 16 carbon atoms such as a monocyclopentylammonium ion, a dicyclopentylammonium ion, a tricyclopentylammonium ion, a monocyclohexylammonium ion, a dicyclohexyl ammonium ion, a monocycloheptylammonium ion, and a dicycloheptylammonium ion; a monoammonium ion having an alkyl group and a cycloalkyl group such as a dimethyl(cyclopentyl)ammonium ion, a dimethyl(cyclohexyl)ammonium ion, and a dimethyl(cycloheptyl)ammonium ion; an alkylcycloalkylammonium ion such as a (methylcyclopentyl)ammonium ion, a bis(methylcyclopentyl)ammonium ion, a (dimethylcyclopentyl)ammonium ion, a bis(dimethylcyclopentyl)ammonium ion, a (ethylcyclopentyl)ammonium ion, a bis(ethylcyclopentyl)ammonium ion, a (methylethylcyclopentyl)ammonium ion, a bis(methylethylcyclopentyl)ammonium ion, a (diethylcyclopentyl)ammonium ion, a (methylcyclohexyl)ammonium ion, a bis(methylcyclohexyl)ammonium ion, a (dimethylcyclohexyl)ammonium ion, a bis(dimethylcyclohexyl)ammonium ion, an (ethylcyclohexyl)ammonium ion, a bis(ethylcyclohexyl)ammonium ion, a (methylethylcyclohexyl)ammonium ion, a (diethylcyclohexyl)ammonium ion, a (methylcycloheptyl)ammonium ion, a bis(methylcycloheptyl)ammonium ion, a (dimethylcycloheptyl)ammonium ion, an (ethylcycloheptyl)ammonium ion, a (methylethylcycloheptyl)ammonium ion, and a (diethylcycloheptyl)ammonium ion.

An alkanolammonium ion such as a monomethanolammonium ion, a dimethanolammonium ion, a trimethanolammonium ion, a monoethanolammonium ion, a diethanolammonium ion, a triethanolammonium ion, a mono(n-propanol)ammonium ion, a di(n-propanol)ammonium ion, a tri(n-propanol)ammonium ion, a monoisopropanolammonium ion, a diisopropanolammonium ion, a triisopropanolammonium ion, a monobutanolammonium ion, a dibutanolammonium ion, a tributanolammonium ion, a monopentanolammonium ion, a dipentanolammonium ion, a tripentanolammonium ion, a monohexanolammonium ion, a dihexanolammonium ion, a monoheptanolammonium ion, a diheptanolammonium ion, a monooctanolammonium ion, a monononanolammonium ion, a monodecanolammonium ion, a monoundecanolammonium ion, a monododecanolammonium ion, a monotridecanolammonium ion, a monotetradecanolammonium ion, a monopentadecanolammonium ion, a monohexadecanolammonium ion, a monomethylmonoethanolammonium ion, a monoethylmonoethanolammonium ion, a monoethylmonopropanolammonium ion, a monoethylmonobutanolammonium ion, a monoethylmonopentanolammonium ion, a monopropylmonoethanolammonium ion, a monopropylmonopropanolammonium ion, a monopropylmonobutanolammonium ion, a monopropylmonopentanolammonium ion, a monobutylmonoethanolammonium ion, a monobutylmonopropanolammonium ion, a monobutylmonobutanolammonium ion, a monobutylmonopentanolammonium ion, a dimethylmonoethanolammonium ion, a diethylmonoethanolammonium ion, a diethylmonopropanolammonium ion, a diethylmonobutanolammonium ion, a diethylmonopentanolammonium ion, a dipropylmonoethanolammonium ion, a dipropylmonopropanolammonium ion, a dipropylmonobutanolammonium ion, a dipropylmonopentanolammonium ion, a dibutylmonoethanolammonium ion, a dibutylmonopropanolammonium ion, a dibutylmonobutanolammonium ion, a dibutylmonopentanolammonium ion, a monomethyldiethanolammonium ion, a monomethyldipropanolammonium ion, a monomethyldibutanolammonium ion, a monomethyldipentanolammonium ion, a monoethyldiethanolammonium ion, a monoethyldipropanolammonium ion, a monoethyldibutanolammonium ion, a monoethyldipentanolammonium ion, a monopropyldiethanolammonium ion, a monopropyldipropanolammonium ion, a monopropyldibutanolammonium ion, a monopropyldipentanolammonium ion, a monobutyldiethanolammonium ion, a monobutyldipropanolammonium ion, a monobutyldibutanolammonium ion, a monobutyldipentanolammonium ion, a monocyclohexylmonoethanolammonium ion, a monocyclohexyldiethanolammonium ion, a monocyclohexylmonopropanolammonium ion, a monocyclohexyldipropanolammonium ion, a mono(β-aminoethyl)monoethanolammonium ion, a monotert-butylmonoethanolammonium ion, a monotert-butyldiethanolammonium ion, a mono(β-aminoethyl)isopropanolammonium ion, a diethylmonoisopropanolammonium ion, a trimethylmonoethanolammonium ion, a triethylmonoethanolammonium ion, a triethylmonopropanolammonium ion, a triethylmonobutanolammonium ion, a triethylmonopentanolammonium ion, a tripropylmonoethanolammonium ion, a tripropylmonopropanolammonium ion, a tripropylmonobutanolammonium ion, a tripropylmonopentanolammonium ion, a diethylmonomethylethanolammonium ion, a bis(2-methoxyethyl)monoethylmonomethylammonium ion, a monoethylmonomethyldiethanolammonium ion, and a diethylmonomethylmonoethanolammonium ion. A monoethylmonoethanolammonium ion, a diethylmonoethanolammonium ion, a diethylmonomethylethanolammonium ion, a bis(2-methoxyethyl)monoethylammonium ion, a bis(2-methoxyethyl)monomethylammonium ion, a monoethyldiethanolammonium ion, or a monoethylmonomethyldiethanolammonium ion is preferable, and a monoethylmonoethanolammonium ion, a diethylmonoethanolammonium ion, or a diethylmonomethylmonoethanolammonium ion is particularly preferable from the viewpoint of easy availability.

A diethylmono(2-isocyanoethyl)ammonium ion, a diethylmono(2-cyano-propyl)ammonium ion, and a diethylmono(1,2-epoxypropane)ammonium ion. Meanwhile, the description such as "N-" or "N,N-" indicating that the substituent is on N is omitted in the ammonium ions above.

Specific examples of the imidazolium ion may include an imidazolium ion, a N-isobutyl imidazolium ion, a 2-methylimidazolium ion, a 2-ethylimidazolium ion, a 2-n-propylimidazolium ion, a 2-isopropylimidazolium ion, a 2-n-butylimidazolium ion, a 2-phenylimidazolium ion, a 4-methylimidazolium ion, a 4-ethylimidazolium ion, a 4-nitro-imidazolium ion, a 4-phenylimidazolium ion, a 2-methyl-4-phenylimidazolium ion, a 4,5-dimethylimidazolium ion, a 1-isobutyl-2-methylimidazolium ion, a 1-isobutyl-2,3-dimethylimidazolium ion, a 2,4,5-trimethylimidazolium ion, a 2,4,5-triphenylimidazolium ion, a benzimidazolium ion, a 2-methylbenzimidazolium ion, and a 2-phenylbenzimidazolium ion. A 1-isobutyl-2-methylimidazolium ion or a 1-isobutyl-2,3-dimethylimidazolium ion is particularly preferable from the viewpoint of easy availability.

Specific examples of the pyridinium ion may include a pyridinium ion, a 2-isobutylpyridinium ion, a 3-isobutylpyridinium ion, a 3-methylpyridinium ion, a 4-methylpyridinium ion, a 2-ethylpyridinium ion, a 3-ethylpyridinium ion, a 4-ethylpyridinium ion, a 4-propylpyridinium ion, a 2-n-hexylpyridinium ion, a 3-n-hexylpyridinium ion, a 3,5-dimethylpyridinium ion, a 3,5-diethylpyridinium ion, a 2,6-di-tert-butylpyridinium ion, a 2-benzylpyridinium ion, a 4-benzylpyridinium ion, a 2-phenylpyridinium ion, a 3-phenylpyridinium ion, a 4-phenylpyridinium ion, a 2,6-diphenylpyridinium ion, a 2-(3-phenylpropyl)pyridinium ion, a 4-(3-phenylpropyl)pyridinium ion, a 2-benzoylpyridinium ion, a 3-benzoylpyridinium ion, a 4-benzoylpyridinium ion, a 2-methoxypyridinium ion, a 2-n-butoxypyridinium ion, a 2,6-dimethoxypyridinium ion, a 2-methoxy-6-methylpyridinium ion, a 4-methoxy-3-nitro-pyridinium ion, a 3-ethoxy-2-nitropyridinium ion, a 2-methoxy-3-nitropyridinium ion, a 4-(4-nitrobenzyl)pyridinium ion, a 2-hydroxypyridinium ion, a 3-hydroxypyridinium ion, a 4-hydroxypyridinium ion, a 2,4-dihydroxypyridinium ion, a 2,6-dihydroxypyridinium ion, a 3-hydroxymethylpyridinium ion, a 4-hydroxymethylpyridinium ion, a 2-(2-hydroxyethyl)pyridinium ion, a 2-hydroxy-6-methylpyridinium ion, a 3-hydroxy-2-methylpyridinium ion, a 5-hydroxy-2-methylpyridinium ion, a 2-hydroxy-3-nitropyridinium ion, a 2-hydroxy-5-nitropyridinium ion, a 4-hydroxy-3-nitropyridinium ion, a 3-hydroxy-2-nitropyridinium ion, a 2-hydroxy-6-methyl-5-nitropyridinium ion, a 2-ethynylpyridinium ion, a 2-methyl-5-ethylpyridinium ion, a 4-ethyl-2-methylpyridinium ion, a 5-butyl-2-methylpyridinium ion, a 2-ethyl-6-isopropyl-pyridinium ion, a 3-ethyl-4-methylpyridinium ion, a 4-(phenylpropyl)pyridinium ion, a 4-(1-piperidyl)pyridinium ion, a 4-pyrrolidinopyridinium ion, a 2-pyrrolidin-2-ylpyridinium ion, a 4-phenoxypyridinium ion, a 2-methyl-3-ethylpyridinium ion, a 2-methyl-5-(iso)propylpyridinium ion, a 2-acetylpyridinium ion, a 3-acetylpyridinium ion, a 4-acetylpyridinium ion, a 2-methyl-5-acetylpyridinium ion, a 2,6-diacetylpyridinium ion, a 2-phenoxy-5-acetylpyridinium ion, a 2,6-bis(hydroxymethyl)pyridinium ion, a 2,2'-bipyridinium ion, a 2,6-bis(p-tolyl)pyridinium ion, a N-Boc-3-hydroxy-1,2,3,6-tetrahydropyridinium ion, and a N-Boc-1,2,3,6-tetrahydropyridinium ion.

Specific examples of the pyrrolidinium ion may include a pyrrolidinium ion, a N-methylpyrrolidinium ion, a N-ethylpyrrolidinium ion, a N-propylpyrrolidinium ion, a N-butylpyrrolidinium ion, a N-phenylpyrrolidinium ion, a N-nitrosopyrrolidinium ion, a 2-methylpyrrolidinium ion, a 2-phenylpyrrolidinium ion, a 3-phenylpyrrolidinium ion, a 3-hydroxy-1-methylpyrrolidinium ion, a 3-(4-methylphenyl)pyrrolidinium ion, 3-(pyrrolidinium-1-ylmethyl)piperidine, and 2-pyrrolidinium-2-ylpyridine.

Specific examples of the pyrrolinium ion may include a pyrrolinium ion, a N-methylpyrrolinium ion, a 2-acetyl-5-methylpyrrolinium ion, methyl pyrrolinium-1-carboxylate, a 2-acetylpyrrolinium ion, a 3-acetylpyrrolinium ion, a 2,5-dimethyl-1-(4-nitrophenyl)-1H-pyrrolinium ion, a 1-furfurylpyrrolinium ion, a 1-(2-nitrophenyl)pyrrolinium ion, a 1,2,5-trimethylpyrrolinium ion, diethyl 2,4-dimethylpyrrolinium-3,5-dicarboxylate, ethyl 4-methylpyrrolinium-3-carboxylate, ethyl 4-phenylpyrrolinium-3-carboxylate, ethyl 3,4,5-trimethylpyrrolinium-2-carboxylate, methyl 2,5-dimethylpyrrolinium-3-carboxylate, methyl 1,2,5-trimethyl-1H-pyrrolinium-3-carboxylate, a N-trimethoxysilylpyrrolinium ion, a N-triethoxysilylpyrrolinium ion, a N-(3-trimethoxysilylpropyl)pyrrolinium ion, and a N-(3-triethoxy silylpropyl) pyrrolinium ion.

Specific examples of the piperidinium ion may include a 2,6-dimethylpiperidinium ion, a 1,3-dimethyl-4-piperidinium ion, a 2,2,6,6-tetramethylpiperidinium ion, a 2,2,6,6-tetramethyl-4-hydroxypiperidinium ion, a 2,2-6-6-tetramethyl-4-acetoxypiperidinium ion, a 2,2,6,6-tetramethyl-4-acetamidepiperidinium ion, a 2,2,6,6-tetramethyl-4-oxopiperidinium ion, a 2,2,6,6-tetramethyl-4-methoxypiperidinium ion, a 2,2,6,6-tetramethyl-4-propoxypiperidinium ion, a 2,2,6,6-tetramethyl-4-(2-hydroxy-4-oxapentoxy)piperidinium ion, a 1,2,2,6,6-pentamethyl-4-oxycarbonyl-2-propenepiperidinium ion, a 1,3-dimethyl-4-[2-cyclopentyl-2-phenylpropanoyl]oxypiperidinium ion, a 1,3-dimethyl-4-(2-cyclopropyl-2-phenylpropanoyl)oxypiperidinium ion, a 1,3-dimethyl-4-(2-cyclopentyl-2-pyridin-3-ylpropanoyl)oxypiperidinium ion, a 1,3-dimethyl-4-[2-cyclopentyl-2-(4-hydroxyphenyl)propanoyl]oxypiperidinium ion, a 1,3-dimethyl-4-(2-cyclobutyl-2-phenylpropanoyl)oxypiperidinium ion, a 1,3-dimethyl-4-[2-cyclopentyl-2-(4-methoxyphenyl)propanoyl]oxypiperidinium ion, a 1,3-dimethyl-4-[2-cyclopentyl-2-(2-thienyl)propanoyl]oxypiperidinium ion, a 1,3-dimethyl-4-[2-cyclopentyl-2-(5-methyl-2-thienyl)propanoyl]oxypiperidinium ion, a 1,3-dimethyl-4-[2-(3-bromophenyl)-2-cyclopentylpropanoyl]oxypiperidinium ion, a 1,3-dimethyl-4-[2-(4-bromophenyl)-2-cyclopentylpropanoyl]oxypiperidinium ion, a 1,3-dimethyl-4-[2-(4-cyanophenyl)-2-cyclopentylpropanoyl]oxypiperidinium ion, a 1,3-dimethyl-4-[2-(3-cyanophenyl)-2-cyclopentylpropanoyl]oxypiperidinium ion, a 1,3-dimethyl-4-[2-(3-methylthiophenyl)-2-cyclopentylpropanoyl]oxypiperidinium ion, a 1,3-dimethyl-4-[2-(4-methylthiophenyl)-2-cyclopentylpropanoyl]oxypiperidinium ion, a 1,3-dimethyl-4-[2-(4-methylsulfonylphenyl)-2-cyclopentylpropanoyl]oxypiperidinium ion, a 1,3-dimethyl-4-[2-(3-methylsulfonylphenyl)-2-cyclopentylpropanoyl]oxypiperidinium ion, a 1,3-dimethyl-4-[2-(4-fluorophenyl)-2-cyclopentylpropanoyl]oxypiperidinium ion, a 1,3-dimethyl-4-[2-(4-chlorophenyl)-2-cyclopentylpropanoyl]oxypiperidinium ion, a 1,3-dimethyl-4-[2-(3-fluorophenyl)-2-cyclopentylpropanoyl]oxypiperidinium ion, and a 1,3-dimethyl-4-[2-(5-chloro-2-thienyl)-2-cyclobutylpropanoyl]oxypiperidinium ion.

Specific examples of the pyrazinium ion may include a pyrazinium ion, pyrazinium methyl carboxylate, pyrazinium-2-carbonitrile, pyrazinium carboxamide, a 2-acetyl-3-ethylpyrazinium ion, a 2-acetyl-3-methylpyrazinium ion, a 2-acetylpyrazinium ion, a 2-(aminomethyl)-5-methylpyrazinium ion, a 2-amino-3-(phenylmethyl)pyrazinium ion, a 2,3-bis(2'-pyridyl)-5,6-dihydropyrazinium ion, a 2-cyanopyrazinium ion, a 2,3-diethyl-5-methylpyrazinium ion, a 2,3-diethylpyrazinium ion, a 6,7-dihydro-5-methyl-5H-cyclopentapyrazinium ion, a 3,5-dimethyl-2-ethylpyrazinium ion, a 2,3-dimethyl-5-isopropylpyrazinium ion, a 2,3-dimethylpyrazinium ion, a 2,5-dimethylpyrazinium ion, a 2,6-dimethylpyrazinium ion, a 2,3-diphenylpyrazinium ion, a 2-ethoxy-3-ethylpyrazinium ion, a 2-ethoxy-3-methylpyrazinium ion, a 2-ethoxy pyrazinium ion, a 5-ethyl-2,3-dimethylpyrazinium ion, 2-ethyl-3-methoxypyrazinium ion, a 2-ethyl-3-methylpyrazinium ion, an ethylpyrazinium ion, a 2-furfurylthiopyrazinium ion, a 5-isobutyl-2,3-dimethylpyrazinium ion, a 2-isobutyl-3-methoxypyrazinium ion, a 2-isopropylpyrazinium ion, a 2-(2-mercaptoethyl)pyrazinium ion, a 2-methoxy-3-ethylpyrazinium ion, a 2-methoxy-3-(1-methylpropyl)pyrazinium ion, a 2-methoxypyrazinium ion, a 5-methyl-6,7-dihydrocyclopentapyrazinium ion, a 2-methylmercapto-3-methylpyrazinium ion, a 2-methyl-3-(methylthio)pyrazinium ion, a 2-methyl-3-n-propylpyrazinium ion, a 2-methylpyrazinium ion, a 2-(methylthio)-3-ethylpyrazinium ion, a 2-(methylthio)pyrazinium ion, a 2-propylpyrazinium ion, a 2-(1H-pyrazol-4-yl)pyrazinium ion, a 2,3,5,6-tetramethylpyrazinium ion, and a 2,3,5-trimethylpyrazinium ion.

Specific examples of the pyrimidinium ion may include a pyrimidinium ion, a 4-methylpyrimidinium ion, a 4-hydroxypyrimidinium ion, a 4,6-dimethylpyrimidinium ion, a 4,6-dihydroxypyrimidinium ion, a 2,4,5-trihydroxypyrimidinium ion, a 4,6-dihydroxy-2-methylpyrimidinium ion, a 4,6-dihydroxy-5-nitropyrimidinium ion, a 2,4-dimethyl-6-hydroxypyrimidinium ion, a 4,6-dimethyl-2-hydroxypyrimidinium ion, a 2-[4-n-(hexyloxy)phenyl]-5-n-octylpyrimidinium ion, a 4-hydroxypyrazolo[3,4-d]-pyrimidinium ion, and a 4,6-dihydroxy-pyrazolo[3,4-d]pyrimidinium ion.

Specific examples of the triazolium ion may include a 1,2,3-triazolium ion, a 1,2,4-triazolium ion, a 3-mercapto-1,2,4-triazolium ion, a 3-hydroxy-1,2,4-triazolium ion, a 3-methyl-1,2,4-triazolium ion, a 1-methyl-1,2,4-triazolium ion, a 1-methyl-3-mercapto-1,2,4-triazolium ion, a 4-methyl-1,2,3-triazolium ion, a benzotriazolium ion, a tolyltriazolium ion, a 1-hydroxybenzotriazolium ion, a 4,5,6,7-tetrahydrotriazolium ion, a 3-amino-1,2,4-triazolium ion, a 3-amino-5-methyl-1,2,4-triazolium ion, a carboxybenzotriazolium ion, a 2-(2'-hydroxy-5'-methylphenyl)benzotriazolium ion, a 2-(2'-hydroxy-5'-tert-butylphenyl)benzotriazolium ion, a 2-(2'-hydroxy-3',5'-di-tert-butylphenyl)benzotriazolium ion, and a 2-(2'-hydroxy-4-octoxyphenyl)benzotriazolium ion.

Specific examples of the triazinium ion may include a 1,2,3-triazinium ion, a 1,2,4-triazinium ion, 1,3,5-triazinium ion, a 3,4-dihydro-3-hydroxy-4-oxo-1,2,3-benzotriazinium ion, a 3-(2-pyridyl)-5,6-diphenyl-1,2,4-triazinium ion, a 5,6-diphenyl-1,2,4-triazinium ion, hexahydro-1,3,5-triethyl-s-triazinium ion, a hexahydro-1,3,5-triphenyl-1,3,5-triazinium ion, a 2-(4-pyridinyl)-1,3,5-triazinium ion, a 2,4,6-triphenyl-s-triazinium ion, a 2,4,6-tri(2-pyridyl)-s-triazinium ion, a 1,3,5-tris(4-pyridyl)-2,4,6-triazinium ion, a 2,4,6-tris(2-pyridyl)-1,3,5-triazinium ion, 1-(1,3,5-triazinium-2-yl)piperazine, and a 2,4,6-tripyridyl-s-triazinium ion.

Specific examples of the quinolinium ion may include a quinolinium ion, a 2-methylquinolinium ion, a 3-methylquinolinium ion, a 4-methylquinolinium ion, a 8-methylquinolinium ion, a 2,8-dimethylquinolinium ion, a 3,8-dimethylquinolinium ion, a 4,8-dimethylquinolinium ion, a 7-methylquinolinium ion, a 2,7-dimethylquinolinium ion, a 3,7-dimethylquinolinium ion, a 4,7-dimethylquinolinium ion, a 6-methylquinolinium ion, a 2,6-dimethylquinolinium ion, a 3,6-dimethylquinolinium ion, a 4,6-dimethylquinolinium ion, a 8-ethylquinolinium ion, a 2-methyl-8-ethylquinolinium ion, a 4-methyl-8-ethylquinolinium ion, a 7-isopropyl-2-methylquinolinium ion, and a 6-tert-butyl-4-methylquinolinium ion.

Specific examples of the isoquinolinium ion may include an isoquinolinium ion, a 3-methylisoquinolinium ion, a 4-methylisoquinolinium ion, a 5-methylisoquinolinium ion, a 6-methylisoquinolinium ion, a 7-methylisoquinolinium ion, a 8-methylisoquinolinium ion, a 1,3-dimethylisoquinolinium ion, a 5,8-dimethylisoquinolinium ion, a 5,6,7,8-tetramethylisoquinolinium ion, a 3-tert-butylisoquinolinium ion, a 4-tert-butylisoquinolinium ion, a 6-tert-butylisoquinolinium ion, and a 7-tert-butylisoquinolinium ion.

Specific examples of the indolinium ion may include an indolinium ion, a 3-methylindolinium ion, a 2-methylindolinium ion, a 1-methyl-3-methylindolinium ion, 2,3-dimethylindolinium ion, a 3-ethylindolinium ion, a 2-phenylindolinium ion, a 3-phenylindolinium ion, a 2,3-phenylindolinium ion, a 2,3-dimethyl-7-nitroindolinium ion, a 2,3-dimethyl-7-chloroindolinium ion, a 3-ethyl-7-methylindolinium ion, a 2,3-dimethyl-7-methoxymethylindolinium ion, a 7-methoxymethyl-3-methylindolinium ion, a 3-(pyridin-2-yl)indolinium ion, a 3-(pyridin-2-yl)-2-methylindolinium ion, a 3-(4,6-dimethoxypyrimidin-2-yl)-2-methylindolinium ion, a 3-(4,6-dimethoxypyrimidin-2-yl)-7-ethyl-2-methylindolinium ion, a 3-(4,6-dimethoxypyrimidin-2-yl)-7-methoxymethyl-2-methylindolinium ion, a 3-(4,6-dimethoxypyrimidin-2-yl)-2-butoxymethylindolinium ion, and a 3-(4,6-diethoxypyrimidin-2-yl)-7-methoxymethylindolinium ion.

Specific examples of the quinoxalinium ion may include a quinoxalinium ion, a 2-methylquinoxalinium ion, and a 2,3-dimethylquinoxalinium ion.

Specific examples of the piperazinium ion may include a piperazinium ion, a N-methylpiperazinium ion, a N-ethylpiperazinium ion, a N-(iso)propylpiperazinium ion, a N-butylpiperazinium ion, a N-phenylpiperazinium ion, a 2-methylpiperazinium ion, a 2,5-dimethylpiperazinium ion, a 2,6-dimethylpiperazinium ion, a 1,4-diphenylpiperazinium ion, a 1-acetylpiperazinium ion, a 1-(1-methylbutyl)piperazinium ion, a 1-benzoylpiperazinium ion, a 1-cyclopentylpiperazinium ion, a 1-formylpiperazinium ion, a 1-phenethylpiperazinium ion, a 1-(4-pyridyl)piperazinium ion, a 1-(2-pyrrolidinoethyl)piperazinium ion, a 1-(o-tolyl)piperazinium ion, a 1,4-diethylpiperazinium ion, a 1,4-diformylpiperazinium ion, a 1-(1,3-dimethylbutyl)piperazinium ion, a 1-(2,3-dimethylphenyl)piperazinium ion, a 1-(2,6-dimethylphenyl)piperazinium ion, a 1-(3,4-dimethylphenyl)piperazinium ion, a N,N'-dimethylpiperazinium ion, a 1-(2-ethoxyethyl)piperazinium ion, a 1-(2-ethoxyphenyl)piperazinium ion, a 1-(2-methoxyethyl)piperazinium ion, a 1-(2-methoxyphenyl)piperazinium ion, a 1-(3-methoxyphenyl)piperazinium ion, a 1-(4-methoxybenzyl)piperazinium ion, a 1-(4-methoxybenzoyl)piperazinium ion, a 1-[2-(phenoxy)ethyl]piperazinium ion, a N-(2-hydroxyethyl)piperazinium ion, a N-(4-hydroxyphenyl)piperazinium ion, a 1-(2-hydroxyethyl)-4-isopropylpiperazinium ion, a N-4-benzyl-2-phenylpiperazinium ion, a 1-benzyl-4-(piperidin-3-ylmethyl)piperazinium ion, a 1-(3-biphenylyl)piperazinium ion, a 1-(4-biphenylyl)piperazinium ion, a 1-cyclohexyl-4-(piperidin-3-ylmethyl)piperazinium ion, a 1-(2,3-dimethylphenyl)-4-(piperidin-3-ylmethyl)piperazinium ion, a 1-(2,4-dimethylphenyl)-4-(piperidin-3-ylmethyl)piperazinium ion, a 1-(2,5-dimethyl-phenyl)-4-(piperidin-3-ylmethyl)piperazinium ion, a 1-ethyl-4-(piperidin-3-ylmethyl)piperazinium ion, a 1-(1-ethylpropyl)piperazinium ion, a 1-(2-methoxyphenyl)-4-(piperidin-3-ylmethyl)piperazinium ion, a 1-(2-methoxyphenyl)-4-(piperidin-4-ylmethyl)piperazinium ion, a 1-(3-methoxyphenyl)-4-(piperidin-3-ylmethyl)piperazinium ion, a 1-(3-methoxyphenyl)-4-(piperidin-4-ylmethyl)piperazinium ion, a 2-methyl-1-(3-methylphenyl)-4-(piperidin-3-ylmethyl)piperazinium ion, a 2-methyl-1-(3-methylphenyl)-4-(piperidin-4-ylmethyl)piperazinium ion, a 1-[(1-methylpiperidin-3-yl)methyl]piperazinium ion, a 1-methyl-4-(piperidin-3-ylmethyl)piperazinium ion, a 1-(3-methylpyridin-2-yl)piperazinium ion, a 1-(piperidin-3-ylmethyl)-4-propylpiperazinium ion, a 1-(piperidin-4-ylmethyl)-4-propylpiperazinium ion, and a 1-acetyl-4-(4-hydroxyphenyl)piperazinium ion.

Specific examples of the oxazolinium ion may include an oxazolinium ion, a 4-methyloxazolidinone ion, a 5-methyloxazolinium ion, a 4-phenyloxazolinium ion, a 4,5-diphenyloxazolinium ion, a 4-ethyloxazolinium ion, a 4,5-dimethyloxazolinium ion, a 5-phenyloxazolinium ion, a benzoxazolinium ion, a 5-chlorobenzoxazolinium ion, a 5-methylbenzoxazolinium ion, a 5-phenylbenzoxazolinium ion, a 6-methylbenzoxazolinium ion, a 5,6-dimethylbenzoxazolinium ion, a 4,6-dimethylbenzoxazolinium ion, a 6-methoxybenzoxazolinium ion, a 5-methoxybenzoxazolinium ion, a 4-ethoxybenzoxazolinium ion, a 5-chlorobenzoxazolinium ion, a 6-methoxybenzoxazolinium ion, a 5-hydroxybenzoxazolinium ion, a 6-hydroxybenzoxazolinium ion, a naphtho[1,2]oxazolinium ion, and a naphtho[2,1]oxazolinium ion.

Specific examples of the thiazolinium ion may include a thiazolinium ion, a 2-aminothiazolinium ion, a 2-methylthiazolinium ion, a 2-methoxythiazolinium ion, a 2-ethoxythiazolinium ion, a 2-isobutylthiazolinium ion, a 2-trimethylsilylthiazolinium ion, a 5-trimethylsilylthiazolinium ion, a 4-methylthiazolinium ion, a 4,5-dimethylthiazolinium ion, a 2-ethylthiazolinium ion, a 2,4-dimethylthiazolinium ion, a 2-amino-5-methylthiazolinium ion, a 2-amino-4-methylthiazolinium ion, a 2,4,5-trimethylthiazolinium ion, a benzothiazolinium ion, a 2-mthyl-benzothiazolinium ion, and a 2,5-dimethylbenzothiazolinium ion.

Specific examples of the morpholinium ion may include a morpholinium ion, a N-methylmorpholinium ion, a N-ethylmorpholine ion, a N-(iso)propylmorpholinium ion, a N-(iso)butylmorpholinium ion, a N-acetylmorpholinium ion, a N-(2-nitrobutyl)morpholinium ion, a N-phenylmorpholinium ion, 4-morpholinoacetophenone, bis(2-morpholinium ethyl) ether, 4-morpholinium nitrobenzene, dimorpholinium methane, acetoacetomorpholide, a 4-tert-butyl-2-(phenoxymethyl)morpholinium ion, a 2,6-dimethylmorpholinium ion, a 4-(2,3-epoxypropyl)morpholinium ion, a N-formylmorpholinium ion, a N-(2-hydroxyethyl)morpholinium ion, a N-(4-nitrophenyl)morpholinium ion, and a N-nonanoylmorpholinium ion. A N-methylmorpholinium ion or a N-ethylmorpholine ion is particularly preferable from the viewpoint of easy availability.

The cation represented by Q1 and Q2 in the Chemical Formulae (1) and (2) above is preferably at least one kind selected from the group consisting of an ammonium ion and a piperidinium ion and more preferably a monoethylmonoethanolammonium ion or a diethylmonoethanolammonium ion.

Examples of the more preferable compound of the ionically bonded salt represented by the Chemical Formula (1) above may include ionically bonded salts represented by the following Chemical Formulae (3) to (7).

[Chem. 5]

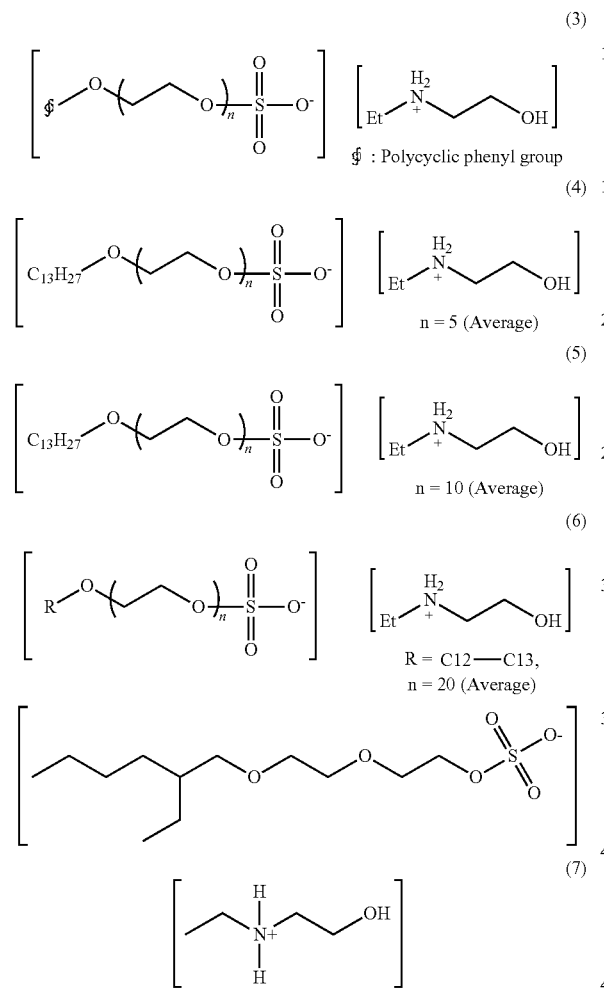

In addition, examples of the more preferable compound of the ionically bonded salt represented by the Chemical Formula (2) above may include ionically bonded salts represented by the following Chemical Formulae (8) to (12).

[Chem. 6]

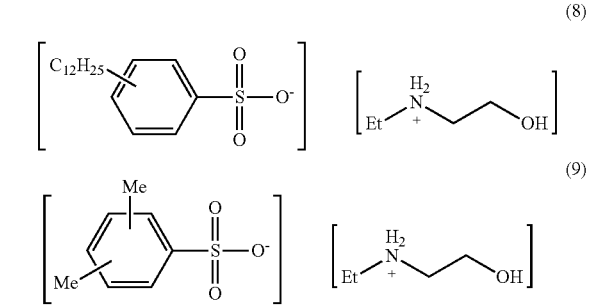

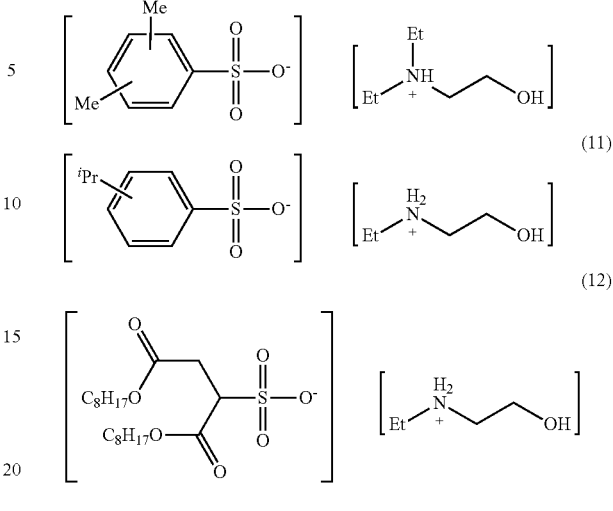

The method of producing the ionically bonded salt is not particularly limited, and examples thereof may include an anion exchange method, a neutralization method, and an acid ester method. In addition, a deammoniation method is also preferably used in which an ammonium salt of sulfuric acid ester or an ammonium salt of sulfonic acid ester is allowed to react with a nitrogen containing-compound to remove ammonia by distillation, whereby an ionically bonded salt is obtained. Meanwhile, each of $C_8H_{17}$—, $C_{12}H_{25}$—, and $C_{13}H_{27}$— described in the Chemical the Formulae (4) to (6), (8), and (12) may be linear or branched. For example, $C_8H_{17}$— may be 2-ethylhexyl.

Meanwhile, any of the ionically bonded salts exemplified above can exert an excellent effect of improving the weather resistance of the thermoplastic resin, but the ionically bonded salt represented by the Chemical Formula (2) above which has a sulfonate anion as a constituent is preferably used from the viewpoint of exhibiting excellent heat resistance with respect to a resin such as an ABS resin, a styrene resin, an olefin resin (including a cyclic olefin resin), a styrene-butadiene copolymer, or an acrylonitrile-butadiene copolymer, which needs to be molded at a high temperature (about from 250 to 280° C.). Among them, the ionically bonded salt represented by the Chemical Formula (2) above is particularly preferably used with respect to an ABS resin. In other words, in a preferred embodiment of the invention, the (a) thermoplastic resin described above is an ABS resin and the (b) ionically bonded salt is an ionically bonded salt represented by the Chemical Formula (2) above.

The content of the component (b) in the thermoplastic resin composition of the invention is preferably from 0.1 to 20 parts by mass and more preferably form 0.5 to 5 parts by mass with respect to 100 parts by mass of the component (a). A thermoplastic resin composition excellent in weather resistance can be obtained when the content is in this range.

The thermoplastic resin composition of the invention may be appropriately blended with another additive component within a range in which the object of the invention is not impaired. Examples of the additive component may include an antioxidant, a filler, a lubricant, a dye, an organic pigment, an inorganic pigment, a plasticizer, a processing aid, a ultraviolet absorber, a light stabilizer, a blowing agent, a wax, a nucleating agent, a mold release agent, a hydrolysis inhibitor, an anti-blocking agent, an antistatic agent, a radical scavenger, an antifogging agent, a scratch preventing agent, an ion trapping agent, a flame retardant, an auxiliary flame retardant, and a surfactant.

The form of the thermoplastic resin composition of the invention is not particularly limited, and the thermoplastic resin composition may be in any form of, for example, a solid, an emulsion, a semi-clear solution, and a clear solution, and is preferably an emulsion from the viewpoint of environmental impact reduction.

Here, the weather resistance of the thermoplastic resin can be improved by adding the ionically bonded salt according to the invention to a thermoplastic resin as a weather resistance improver, and the mechanism is presumed as follows. In other words, it is possible to obtain a resin composition hardly contaminated by the adhered over time or even at a high temperature when the ionically bonded salt acts as a weather resistance improver since the bleeding of the salt itself is suppressed by the use of the ionically bonded salt according to the invention. Here, it is generally considered that a weather resistance improving effect or an antistatic effect by a solid-like compound typified by a surfactant is exerted through the formation of a charge leakage layer by a surfactant bled on the surface with moisture in the air. On the other hand, a liquid-like compound exhibits high molecular mobility and thus the rearrangement of the molecules due to charge generation easily occurs. In addition, the melting point of the ionically bonded salt becomes lower than that of the compound having sodium or ammonium as a counter cation by adopting a counter cation which has the predetermined structure described above, and thus, there is also a compound which is liquid at room temperature. Alternatively, the molecular mobility can also be enhanced in a compound which easily becomes liquid since the melting point thereof is lowered even though the compound is solid at room temperature. In other words, it is considered that an excellent weather resistance improving effect is obtained by the ionically bonded salt according to the invention even without bleeding thereof onto the surface compared with a surfactant since the molecular mobility of the ionically bonded salt is high and the charge neutralization mechanism by the molecular rearrangement due to charge generation works. Meanwhile, the same mechanism is also presumed with regard to a water resistance improving effect, and it is considered that the predetermined ionically bonded salt described above hardly bleeds as described above and thus can improve water resistance or durability compared with a surfactant. Moreover, it is considered that the ionically bonded salt contributes to the improvement in water resistance or durability by being adsorbed to a substrate that is positively or negatively charged since the degree of freedom of the molecules or the molecular mobility thereof is high. Furthermore, the same mechanism as the mechanism of action described above is presumed in a case in which the ionically bonded salt is used as an activator for emulsion polymerization or is used by being kneaded with a resin as an additive.

[Method of Producing Thermoplastic Resin Composition]

The method of producing the thermoplastic resin composition of the invention is not particularly limited, and examples thereof may include a method in which the component (a), the component (b), and another additive if necessary are melt-kneaded. The method of melt-kneading is not particularly limited, and it is possible to adopt a method which uses a device such as a single screw extruder, a twin-screw extruder, a heat roll, the Banbury mixer, the Henschel mixer, a tumbler mixer, or various kinds of kneaders.

In addition, a method of obtaining a composition of the invention can also be suitably used in terms of excellent productivity thereof in which a monomer which is a starting material of the (a) thermoplastic resin is emulsion polymerized in an aqueous solvent using the (b) ionically bonded salt described above as an emulsifier in the presence of a polymerization initiator. At this time, another surfactant such as an anionic surfactant or a nonionic surfactant can be used together with the (b) ionically bonded salt described above as an emulsifier.

[Application of Thermoplastic Resin Composition]

The application of the thermoplastic resin composition of the invention may include, for example, a paint, an adhesive, a pressure-sensitive adhesive, a textile auxiliary, a paper making application (a surface coating agent, or the like), a civil engineering application (such as an admixture for concrete, or the like), and the like.

EXAMPLES

Hereinafter, the invention will be described in more detail by reference to Examples, but the invention is not intended to be limited in any way by the following Examples. Meanwhile, the indication "part" or "%" used in some cases below represent "part by mass" or "% by mass" unless otherwise stated.

Synthesis Example 1

Synthesis of [MEM][DB-SO$_3$]

To 326.5 parts by mass of dodecylbenzenesulfonic acid (isomer mixture of o-, m-, and p-dodecylbenzenesulfonic acids) (trade name: TAYCATOX 120, abbreviation: DB-SO$_3$H manufactured by TAYCA CORPORATION), 93.6 parts by mass of N-monoethylethanolamine (trade name: aminoalcohol MEM, abbreviation: MEM manufactured by Nippon Nyukazai Co., Ltd.) was added dropwise, and then the resultant was reacted for 1 hour. After the reaction, excess MEM was distilled off under reduced pressure, thereby obtaining 415.6 parts by mass of the desired ionically bonded salt (abbreviation: [MEM][DB-SO$_3$], the compound represented by the Chemical Formula (8) above).

Synthesis Example 2

Synthesis of [MEM][N-707-S]

In the same manner as in the Synthesis Example 1 except using 920.1 parts by mass of ammonium salt of polyoxyethylene polycyclic phenyl ether sulfuric acid ester (abbreviation: 707-SF) obtained by distilling a 30% aqueous solution of ammonium salt of polyoxyethylene polycyclic phenyl ether sulfuric acid ester (trade name: NEWCOL 707-SF, abbreviation: N-707-SF manufactured by Nippon Nyukazai Co., Ltd.) off under reduced pressure instead of DB-SO$_3$H, 992.2 parts by mass of the desired ionically bonded salt (abbreviation: [MEM][N-707-S], the compound represented by the Chemical Formula (3) above) was obtained.

Synthesis Example 3

Synthesis of [MEM][N-1305-S]

In the same manner as in the Synthesis Example 1 except using 517.4 parts by mass of ammonium salt of polyoxyethylene tridecyl ether sulfuric acid ester (abbreviation: 1305-SF) synthesized by a known method instead of DB-SO$_3$H, 589.5 parts by mass of the desired ionically bonded salt (abbreviation: [MEM][N-1305-S], the compound represented by the Chemical Formula (4) above) was obtained.

Synthesis Example 4

Synthesis of [MEM][N-1310-S]

In the same manner as in the Synthesis Example 1 except using 738.0 parts by mass of ammonium salt polyoxyethylene tridecyl ether sulfuric acid ester (abbreviation: 1310-SF) synthesized by a known method instead of DB-SO$_3$H, 810.1 parts by mass of the desired ionically bonded salt (abbreviation: [MEM][N-1310-S], the compound represented by the Chemical Formula (5) above) was obtained.

Synthesis Example 5

Synthesis of [MEM][N-2320-S]

In the same manner as in the Synthesis Example 1 except using 1170.0 parts by mass of ammonium salt polyoxyethylene alkyl ether sulfuric acid ester (abbreviation: 2320-SF) synthesized by a known method instead of DB-SO$_3$H, 1242.1 parts by mass of the desired ionically bonded salt (abbreviation: [MEM][N-2320-S], the compound represented by the Chemical Formula (6) above) was obtained.

Example 1

Into a flask equipped with a condenser tube, a nitrogen inlet tube, a thermometer, a semicircular Teflon stirring blade, 100.0 parts by mass of water was introduced and heated to 80° C. Separately, 50.0 parts by mass of n-butyl acrylate, 35.0 parts by mass of methyl methacrylate, 15.0 parts by mass of styrene, 2.0 parts by mass of acrylic acid, 2.04 parts by mass of [MEM][DB-SO$_3$] synthesized in the Synthesis Example 1 as an emulsifier, 86.3 parts by mass of water, and 5.1 parts by mass of a 10% aqueous solution of ammonium peroxodisulfate were introduced into an Erlenmeyer flask and mixed to obtain a mixture. 15.7 parts by mass of this mixture was introduced into the above flask equipped with a condenser tube and the like and was heated to 80° C., and the initial polymerization was performed for 30 minutes. Thereafter, the mixture in the Erlenmeyer flask was added into the resultant in the flask equipped with a condenser tube and the like dropwise at 80° C. over 3 hours. Further, aging of the resultant was performed at 80° C. for 1 hour, and then neutralization thereof was performed using 1.1 parts by mass of 28% ammonia water to obtain an emulsion.

Example 2

An emulsion was obtained in the same manner as in the Example 1 except mixing 2.04 parts by mass of [MEM][N-707-S] obtained in the Synthesis Example 2 instead of [MEM][DB-SO$_3$].

Example 3

An emulsion was obtained in the same manner as in the Example 1 except mixing 2.04 parts by mass of [MEM][N-1305-S] obtained in the Synthesis Example 3 instead of [MEM][DB-SO$_3$].

Example 4

An emulsion was obtained in the same manner as in the Example 1 except mixing 2.04 parts by mass of [MEM][N-1310-S] obtained in the Synthesis Example 4 instead of [MEM][DB-SO$_3$].

Example 5

An emulsion was obtained in the same manner as in the Example 1 except mixing 2.04 parts by mass of [MEM][N-2320-S] obtained in the Synthesis Example 5 instead of [MEM][DB-SO$_3$].

Comparative Example 1

An emulsion was obtained in the same manner as in the Example 1 except mixing 2.04 parts by mass of DB-SO$_3$H instead of [MEM][DB-SO$_3$].

Comparative Example 2

An emulsion was obtained in the same manner as in the Example 1 except mixing 2.04 parts by mass of 707-SF instead of [MEM][DB-SO$_3$].

Comparative Example 3

An emulsion was obtained in the same manner as in the Example 1 except mixing 2.04 parts by mass of 1305-SF instead of [MEM][DB-SO$_3$].

Comparative Example 4

An emulsion was obtained in the same manner as in the Example 1 except mixing 2.04 parts by mass of 1310-SF instead of [MEM][DB-SO$_3$].

Comparative Example 5

An emulsion was obtained in the same manner as in the Example 1 except mixing 2.04 parts by mass of 2320-SF instead of [MEM][DB-SO$_3$].

(Evaluation)

[pH and Viscosity]

The pH of the emulsion thus obtained was measured using pH METER F-51 manufactured by HORIBA, Ltd. In addition, the viscosity of the emulsion thus obtained was measured using a BL-type viscometer, VISCOMETER manufactured by TOKIMEC INC.

[Emulsion Polymerization Properties]

The initial emulsion stability was evaluated as follows by visually observing the state of a liquid obtained by allowing a pre-emulsion to stand for 10 minutes.

◯: not layer separated

X: layer separated

The polymerization stability was expressed as a percentage of mass of the filtration residue after emulsion polymerization/mass of the solid content in the emulsion.

The polymerization conversion was calculated by percentage of % by mass of nonvolatile content of emulsion/% by mass of theoretical nonvolatile content of emulsion (50.5%).

The average particle size of the particles in the emulsion was measured by a scattering particle size distribution analyzer, LA-950 manufactured by Horiba, Ltd.

Moreover, the emulsion obtained in the Examples and the Comparative Examples was applied on a glass plate at a film thickness of 75 μm, dried for 3 minutes by a dryer at 110° C., whereby a specimen having a film thickness about 15 μm was obtained. The evaluations described below were performed using this specimen.

[Water Resistance]

The water resistance was evaluated as follows by observing the state of the paint film obtained by the specimen thus prepared in water for 24 hours.

State of cloudiness (water resistance)
⊙: entirely transparent
○: partially blue cloudy
Δ: entirely blue cloudy
x: entirely cloudy Presence or absence of peeling (adhesive property)
⊙: not peeled off (not peeled off even rubbed with a finger)
○: not peeled off (peeled off when rubbed with a finger)
Δ: partially peeled off
x: entirely peeled off

[Antistatic Property Test (Surface Intrinsic Resistivity)]

The surface intrinsic resistivity of the specimen after production was measured at an applied voltage of 250 V using a high resistivity meter, High Leicester UP and URS probe manufactured by Mitsubishi Chemical Analytech Co., Ltd. In addition, tap water was flowed on the specimen for 30 seconds (about 1 L), subsequently the specimen was rinsed with ion exchanged water, water drop was wiped off therefrom, and then the specimen was dried for 5 minutes at 110° C. The surface intrinsic resistivity of the specimen after being subjected to this process one time was measured in the same manner as above.

Meanwhile, the indication "over" in Table 1 means that the measured value exceeded $10^{13}$, and the indication "-" means that the measurement was not performed.

[Gloss Property (Weather Resistance)]

The value of gloss was measured using GLOSS CHECKER IG-331 manufactured by Horiba, Ltd. after the specimen was subjected to natural exposure (the specimen was subjected to outdoor exposure by being faced to the south and inclined at 30° for one month). The gloss retention was obtained by calculating the percentage of the value of gloss after natural exposure/initial value of gloss with regard to each specimen. It means that the weather resistance is excellent as the value of the gloss retention is greater.

The composition of each of the emulsions of Examples and Comparative Examples and the results of the evaluations are shown in Table 1.

TABLE 1

| | Example 1 | Comparative Example 1 | Example 2 | Comparative Example 2 | Example 3 | Comparative Example 3 | Example 4 | Comparative Example 4 | Example 5 | Comparative Example 5 |
|---|---|---|---|---|---|---|---|---|---|---|
| Composition of monomer (part by mass) | | | | | | | | | | |
| Butyl acrylate | 50 | ← | ← | ← | ← | ← | ← | ← | ← | ← |
| Methyl methacrylate | 35 | ← | ← | ← | ← | ← | ← | ← | ← | ← |
| Styrene | 15 | ← | ← | ← | ← | ← | ← | ← | ← | ← |
| Acrylic acid | 2 | ← | ← | ← | ← | ← | ← | ← | ← | ← |
| Emulsifier (part by mass) | | | | | | | | | | |
| [MEM] [DB-SO$_3$] | 2.04 | | | | | | | | | |
| [MEM] [N-707-S] | | | 2.04 | | | | | | | |
| [MEM] [N-1305-S] | | | | | 2.04 | | | | | |
| [MEM] [N-1310-S] | | | | | | | 2.04 | | | |
| [MEM] [N-2320-S] | | | | | | | | | 2.04 | |
| DB-SO$_3$H | | 2.04 | | | | | | | | |
| 707-SF | | | | 2.04 | | | | | | |
| 1305-SF | | | | | | 2.04 | | | | |
| 1310-SF | | | | | | | | 2.04 | | |
| 2320-SF | | | | | | | | | | 2.04 |
| Polymerization initiator (/monomer) | | | | | | | | | | |
| 10% aqueous solution of ammonium peroxodisulfate | 0.5% | ← | ← | ← | ← | ← | ← | ← | ← | ← |
| Amount of monomer seed (/monomer) | 5% | 5% | 5% | 5% | 5% | 10% | 5% | 10% | 5% | 5% |
| Neutralizer (part by weight) | | | | | | | | | | |
| 28% ammonia water | 1.1 | 1.8 | 1.1 | 1.0 | 1.0 | 1.1 | 0.9 | 1.0 | 0.9 | 1.1 |
| pH | 2.1 → 8.1 | 1.4 → 8.1 | 2.1 → 8.0 | 2.2 → 8.0 | 2.1 → 8.1 | 2.1 → 8.1 | 2.2 → 8.1 | 2.2 → 8.0 | 2.4 → 8.1 | 2.4 → 8.1 |
| Viscosity 60 rpm (mPa · s) | | | | | | | | | | |
| Before neutralization | 120 | 138 | 78 | 90 | 176 | 445 | 191 | 210 | 161 | 63 |

TABLE 1-continued

| | Example 1 | Comparative Example 1 | Example 2 | Comparative Example 2 | Example 3 | Comparative Example 3 | Example 4 | Comparative Example 4 | Example 5 | Comparative Example 5 |
|---|---|---|---|---|---|---|---|---|---|---|
| After neutralization | 141 | 383 | 97 | 101 | 108 | 245 | 161 | 181 | 144 | 140 |
| Initial emulsion stability | ○ | ○ | ○ | ○ | ○ | ○ | ○ | ○ | ○ | ○ |
| Polymerization stability (%) | 0 | 0 | 0.02 | 0.01 | 0.03 | 0.05 | 0 | 0.05 | 0.04 | 0.04 |
| Polymerization conversion (%) | 99.5 | 99.2 | 99.3 | 100 | 99.0 | 99.8 | 99.6 | 99.8 | 99.7 | 99.7 |
| Average particle size (μm) | 0.09 | 0.13 | 0.09 | 0.13 | 0.09 | 0.08 | 0.10 | 0.10 | 0.08 | 0.10 |
| Water resistance | ○ | X | Δ | X | ○ | Δ | Δ | X | ○ | X |
| Adhesive property | ○ | X | Δ | X | ○ | X | X | X | ○ | ○ |
| Surface resistivity (Ω/) | $3 \times 10^{11}$ | $3 \times 10^{11}$ | over | over | $3 \times 10^{9}$ | $2 \times 10^{10}$ | $3 \times 10^{10}$ | $2 \times 10^{12}$ | over | over |
| Surface resistivity after washing with water (Ω/) | $3 \times 10^{11}$ | over | — | — | $1 \times 10^{10}$ | over | $2 \times 10^{10}$ | over | — | — |
| Gloss property (20°) | | | | | | | | | | |
| Gloss retention after one month (%) | 93.5 | 89.7 | 90.5 | 77.8 | 81.7 | 75.3 | 76.2 | 66.7 | 90.5 | 73.3 |

As apparently can be seen from the Table 1, the paint films obtained from the thermoplastic resin compositions of the invention of the Examples 1 to 5 are excellent in weather resistance. Moreover, the paint films obtained from the thermoplastic resin compositions of the invention are excellent in water resistance and/or adhesive property.

The invention claimed is:

1. A method for improving a gloss retention property of a thermoplastic resin composition comprising the step of combining
   (a) a thermoplastic resin, where said thermoplastic resin is not an aromatic polycarbonate resin or a polyvinyl chloride resin, and
   (b) as ionically bonded salt represented by the following Chemical Formula (1) or (2):

[Chem. 1]

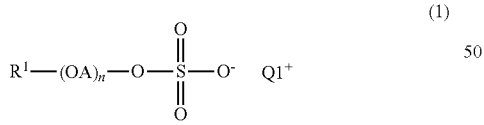

(1)

[Chem. 2]

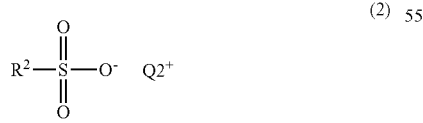

(2)

in the Chemical Formula (I) above, $R^1$ represents a substituted or unsubstituted linear, branched, or cyclic alkyl group having from 1 to 30 carbon atoms, a substituted or unsubstituted aryl group having from 6 to 30 carbon atoms where the aryl group is not substituted with an alkyl group, or a substituted or unsubstituted arylalkyl group having from 7 to 31 carbon atoms, A is a linear or branched alkylene group having from 2 to 4 carbon atoms, n represents an integer of 1 to 50, Q1 represents at least one kind selected from the group consisting of a dimethylammonium ion, a trimethylammonium ion, a diethylammonium ion, a triethylammonium ion, a monopropylammonium ion, a dipropylammonium ion, a tripropylammonium ion, a monobutylammonium ion, a dibutylammonium ion, a tributylammonium ion, a monopentylammonium ion, a dipentylaminoammonium ion, a tripentylammonium ion, a monohexylammonium ion, a dihexylammonium ion, a monoheptylammonium ion, a diheptylammonium ion, a monooctylammonium ion, a dioctylammonium ion, a monononylammonium ion, a monodecylammonium ion, a monoundecylammonium ion, a monododecylammonium ion, a monotridecylammonium ion, a monotetradecylammonium ion, a monopentadecylammonium ion, a monohexadecylammonium ion, a monoheptadecylammonium ion, a monooctadecylammonium ion, a mononadecylammonium ion, a monoicosylammonium ion, a monohenicosylammonium ion, a monodocosylammonium ion, a monotricocylammonium ion, a methyl(ethyl)ammonium ion, a methyl(propyl)ammonium ion, a methyl(butyl)ammonium ion, a methyl(pentyl)ammonium ion, a methyl(hexyl)ammonium ion, a methyl(heptyl)ammonium ion, a methyl(octyl)ammonium ion, a methyl(nonyl)ammonium ion, a methyl(decyl)ammonium ion, a methyl(undecyl)ammonium ion, a methyl(dodecyl)ammonium ion, a methyl(tridecyl)ammonium ion, a methyl(tetradecyl)ammonium ion, a methyl(pentadecyl)ammonium ion, a methyl(hexadecyl)ammonium ion, a methyl(heptadecyl)ammonium ion, a methyl(octadecyl)ammonium ion, a methyl(nonadecyl)ammonium ion, a methyl(icosyl)ammonium ion, a methyl(henicosyl)ammonium ion, a methyl(tricosyl)ammonium ion, an ethyl(propyl)ammonium ion, an ethyl(butyl)ammonium ion, an ethyl(pentyl)ammonium ion, an ethyl(hexyl)ammonium ion, an ethyl(heptyl)ammonium ion, an ethyl(octyl)ammonium ion, an ethyl(nonyl)ammonium ion, an ethyl(decyl)ammonium ion, an ethyl(undecyl)ammonium ion, an ethyl(dodecyl)ammonium ion, an ethyl(tridecyl)ammonium ion, an ethyl(tetradecyl)ammonium ion, an ethyl(pentadecyl)ammonium ion, an ethyl(hexadecyl)ammonium ion, an ethyl(heptadecyl)ammonium ion, an ethyl(octadecyl)ammonium ion, an ethyl(nonadecyl)ammonium ion, an ethyl(icosyl)ammonium ion, an ethyl(henicosyl)ammonium ion, an ethyl(tricosyl)ammonium ion, a dimethyl(ethyl)ammonium ion, a dimethyl(propyl)ammonium ion, a dimethyl(butyl)ammonium ion, a dimethyl(pentyl)ammonium ion, a dimethyl(hexyl)ammonium ion, a dimethyl(heptyl)ammonium ion, a dimethyl(octyl)ammonium ion, a dimethyl(nonyl)ammonium ion, a dimethyl(decyl)ammonium ion, a dimethyl(undecyl)ammonium ion, a dimethyl(dodecyl)ammonium ion, a dimethyl(tridecyl)ammonium ion, a dimethyl(tetradecyl)ammonium ion, a dimethyl(pentadecyl)ammonium ion, a dimethyl(hexadecyl)ammonium ion, a dimethyl(heptadecyl)ammonium ion, a dimethyl(octadecyl)ammonium ion, a dimethyl(nonadecyl)ammonium ion, a dimethyl(icosyl)ammonium ion, a dimethyl(henicosyl)ammonium ion, a dimethyl(tricosyl)ammonium ion, a monobenzylammonium ion, a (1-phenethyl)ammonium ion, a (2-phenethyl)ammonium ion, a dibenzylammonium ion, a bis(1-phenethyl)ammonium ion, a bis(2-phenethyl)ammonium ion, a monocyclopentylammonium ion, a dicyclopentylammonium ion, a tricyclopentylammonium ion, a monocyclohexylammonium ion, a dicyclohexyl ammonium ion, a monocycloheptylammonium ion, a dicycloheptylammonium ion, a dimethyl(cyclopentyl)ammonium ion, a dimethyl(cyclohexyl)ammonium ion, a dimethyl(cycloheptyl)ammonium ion, a (methylcyclopentyl)ammonium ion, a bis(methylcyclopentyl)ammonium ion, a (dimethylcyclopentyl)ammonium ion, a bis(dimethylcyclopentyl)ammonium ion, a (ethylcyclopenty)ammonium ion, a bis(ethylcyclopentyl)ammonium ion, a (methylethylcyclopentyl)ammonium ion, a bis(methylethylcyclopentyl)ammonium ion, a (diethylcyclopentyl)ammonium ion, a (methylcyclohexyl)ammonium ion, a bis(methylcyclohexyl)ammonium ion, a (dimethylcyclohexyl)ammonium ion, a bis(dimethylcyclohexyl)ammonium ion, an (ethylcyclohexyl)ammonium ion, a bis(ethylcyclohexyl)ammonium ion, a (methylethylcyclohexyl)ammonium ion, a (diethylcyclohexyl)ammonium ion, a (methylcycloheptyl)ammonium ion, a bis(methylcycloheptyl)ammonium ion, a (dimethylcycloheptyl)ammonium ion, an (ethylcycloheptyl)ammonium ion, a (methylethylcycloheptyl)ammonium ion, a (diethylcycloheptyl)ammonium ion, a monomethanolammonium ion, a dimethanolammonium ion, a monoethanolammonium ion, a diethanolammonium ion, a mono(n-propanol)ammonium ion, a di(n-propanol)ammonium ion, a monoisopropanolammonium ion, a diisopropanolammonium ion, a monobutanolammonium ion, a dibutanolammonium ion, a tributanolammonium ion, a monopentanolammonium ion, a dipentanolammonium ion, a tripentanolammonium ion, a monohexanolammonium ion, a dihexanolammonium ion, a monoheptanolammonium ion, a diheptanolammonium ion, a monooctanolammonium ion, a monononanolammonium ion, a monodecanolammonium ion, a monoundecanolammonium ion, a monododecanolammonium ion, a monotridecanolammonium ion, a monotetradecanolammonium ion, a monopentadecanolammonium ion, a monohexadecanolammonium ion, a monomethylmonoethanolammonium ion, a monoethylmonoethanolammonium ion, a monoethylmonopropanolammonium ion, a monoethylmonobutanolammonium ion, a monoetylpentanolammonium ion, a monopropylmonoethanolammonium ion, a monopropylmonopropanolammonium ion, a monopropylmonobutanolammonium ion, a monopropylmonopentanolammonium ion, a monobutylmonoethanolammonium ion, a monobutylmonopropanolammonium ion, a monobutylmonobutanolammonium ion, a monobutylmonopentanolammonium ion, a dimethylmonoethanolammonium ion, a diethylmonoethanolammonium ion, a diethylmonopropanolammonium ion, a diethylmonobutanolammonium ion, a diethylmonopentanolammonium ion, a dipropylmonoethanolammonium ion, a dipropylmonopropanolammonium ion, a dipropylmonobutanolammonium ion, a dipropylmonopentanolammonium ion, a dibutylmonoethanolammonium ion, a dibutylmonopropanolammonium ion, a dibutylmonobutanolammonium ion, a dibutylmonopentanolammonium ion, a monomethyldiethanolammonium ion, a monomethyldipropanolammonium ion, a monomethyldibutanolammonium ion, a monomethyldipentanolammonium ion, a monoethyldiethanolammonium ion, a monoethyldipropanolammonium ion, a monoethyldibutanolammonium ion, a monoethyldipentanolammonium ion, a monopropyldiethanolammonium ion, a monopropyldipropanolammonium ion, a monopropyldibutanolammonium ion, a monopropyldipentanolammonium ion, a monobutyldiethanolammonium ion, a monobutyidipropanolammonium ion, a monobutyldibutanolammonium ion, a monobutyldipentanolammonium ion, a monocyclohexylmonoethanolammonium ion, a monocyclohexyldiethanolammonium ion, a monocyclohexylmonopropanolammonium ion, a monocyclohexyldipropanolammonium ion, a mono(β-aminoethyl)monoethanolammonium ion, a monotertbutylmonoethanolammonium ion, and a mono(β-aminoethyl)isopropanolammonium ion,

[Chem. 2]

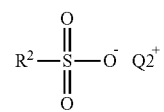

(2)

in the Chemical Formula (2) above, $R^2$ represents 1,2-Bis (2-ethylhexyloxycarbonyl)ethyl group, a substituted or unsubstituted aryl group having from 6 to 30 carbon atoms where the aryl group is not substituted with an alkyl group, or a substituted or unsubstituted arylalkyl group having from 7 to 31 carbon atoms with the proviso that the aryl group is not a naphthyl group or not substituted with a substituted or unsubstituted phenyl group, A is a linear or branched alkylene group having from 2 to 4 carbon atoms, n represents an integer of 1 to 50, Q2 represents at least one kind selected from the group consisting of a monomethanolammonium ion, a dimethanolammonium ion, a monoethanolammonium ion, a diethanolammonium ion, a mono(n-propanol)ammonium ion, a di(n-propanol)ammonium ion, a monoisopropanolammonium ion, a diisopropanolammonium ion, a monobutanolammnonium ion, a dibutanolammonium ion, a tributanolammonium ion, a monopentanolammonium ion, a dipentanolammonium ion, a tripentanolammonium ion, a monohexanolammonium ion, a dihexanolammonium ion, a monononanolammonium ion, a diheptanolammonium ion, a monooctanolammonium ion, a monononanolammonium ion, a monodecanolammonium ion, a monoundecanolammonium ion, a monoclodecanolammonium ion, a monotridecanolammonium ion, a monotetradecanolammonium ion, a monopentadecanolammonium ion, a monohexadecanolammonium ion, a monomethylmonothanolammonium ion, a monoethylmonoethanolammonium ion, a monoethylmonopropanolamnonium ion, a monoethylmonobutanolammonium ion, a monoethylpentanolammonium ion, a monopropylmonoethanolammonium ion, a monopropylmonopropanolammonium ion, a monopropylmonobutanolammonium ion, a monopropylmonopentanolammonium ion, a monobutymonoethanolammonium ion, a monobutylmonopentanolammonium ion, a monobutylmonobutanolammonium ion, a monobutylmonopentanolammonium ion, a dimethylmonoethanolammonium ion, a diethylmonoethanolammonium ion, a diethylmonopropanolammonium ion, a diethylmonobutanolammonium ion, a diethylmonopentanolammonium ion, a dipropylmonoethanolammonium ion, a dipropylmonopropanolammonium ion, a dipropylmonobutanolammonium ion, a dipropylmonopentanolammonium ion, a dibutylmonoethanolammonium ion, a dibutylmonopentanolammonium ion, a dibutylmonobutanolammonium ion, a dibutylmonopentanolammonium ion, a monomethyldiethanolammonium ion, a monomethyldipropanolammonium ion, a monomethyldibutanolammonium ion, a monomethyldipetanolammonium ion, a monoethyldiethanolammonium ion, a monoethyldipropanolammonium ion, a monoethyldibutanolammonium ion, a monoethyldipentanolammonium ion, a monopropyldiethanolammonium ion, a monopropyldipropanolammonium ion, a monopropyldibutanolammonium ion, a monopropyldipentanolammonium ion, a monobutyldiethanolammonium ion, a monobutyldipropanolammonium ion, a monobutyldibutanolaumonium ion, a monobutyldipentanolammonium ion, a monocyclohexylmonoethanolammonium ion, a monocyclohexyldiethanolammonium ion, a monocyclohexylmonopropanolammonium ion, a monocyclohexyldipropanolammonium ion, a mono(β-aminoethyl)monoethanolammenium ion, a monotert-butylmonoethanolammonium ion, a monotert-butyldiethanolammonium ion, a mono(β-aminoethyl) isopronanolammonium ion, and a diethylmonoisopropanolammonium ion, wherein the thermoplastic resin composition is in the form of an emulsion when the (b) ionically bonded salt is represented by the Chemical Formula (1) above.

2. The method for improving a gloss retention property of a thermoplastic resin composition according to claim 1, wherein the content of the (b) ionically bonded salt is from 0.1 to 20 parts by mass with respect to 100 parts by mass of the (a) thermoplastic resin.

3. The method for improving a gloss retention property of a thermoplastic resin composition according to claim 1, wherein the (a) thermoplastic resin is at least one kind selected from the group consisting of a (meth)acrylic resin, a styrene resin, an olefin resin, a polyester resin, and an acrylonitrile-butadiene-styrene copolymer (ABS resin).

4. The method for improving a gloss retention property of a thermoplastic resin composition according to claim 1, wherein the (a) thermoplastic resin is an acrylonitrile-butadiene-styrene copolymer (ABS resin), and the (b) ionically bonded salt is an ionically bonded salt represented by the Chemical Formula (2) above.

5. The method for improving a gloss retention property of a thermoplastic resin composition according to claim 1, wherein the (b) ionically bonded salt is an ionically bonded salt represented by the Chemical Formula (2) above, and the thermoplastic resin composition is in the form of an emulsion.

6. The method for improving a gloss retention property of a thermoplastic resin composition according to claim 1, wherein $R^1$ is an aryl group substituted with a group selected from the group consisting of a hydroxyl group, a carboxyl group, a formyl group, a mercapto group, a sulfo group, a mesyl group, p-toluenesulfonyl group, an amino group, a nitro group, a cyano group, a trifluoromethyl group, a trichloromethyl group, a trimethylsilyl group, a phosphinico group, and a phosphuno group, a halogen, a p-tolyl group, a xylyl group, a cumenyl group, an anthryl group, and a phenanthryl group, an alkoxy group, an aryloxy group, an alkoxycarbonyl group, an acyloxy group, an acyl group, an alkylsulfanyl group, an arylsulfanyl group, an alkylamino group, a dialkylamino, and an arylamino group, and wherein $R^2$ is an aryl group substituted with a group selected from the group consisting of a hydroxyl group, a carboxyl group, a formyl group, a mercapto group, sulfo group, a mesyl group, a p-toluenesulfonyl group, an amino group, a nitro group, a cyano group, a trifluoromethyl group, a trichloromethyl group, a trimethylsilyl group, a phosphinico group, and a phosphono group, a halogen, an anthryl group, and a phenanthryl group, an alkoxy group, an aryloxy group, an alkoxycarbonyl group, an acyloxy group, an acyl group, an alkylsulfanyl group, an arylsulfanyl group, an alkylamino group, a dialylamino, and an arylamino group.

7. The method for improving a gloss retention property of a thermoplastic resin composition according to claim 1, wherein said thermoplastic resin is selected from the group consisting of a (meth)acrylic resin, a styrene resin, an olefin resin, a polyester resin, a polyamide resin, a polyphenylene ether resin, a polyphenylene sulfide resin, a fluororesin, a polysulfone resin, a cellulose derivative, a silicone resin, a polyvinyl ester resin, a polyvinyl alcohol resin, a diene rubber, an acrylic rubber, a urethane rubber, and a silicone rubber.

8. The method for improving a gloss retention property of a thermoplastic resin composition according to claim 1, wherein the (b) ionically bonded salt is an ionically bonded salt represented by the Chemical Formula (2) above.

9. A method for improving a gloss retention property of a thermoplastic resin composition comprising the step of combining:

(a) a thermoplastic resin, where said thermoplastic resin is not an aromatic polycarbonate resin or a polyvinyl chloride resin, and (b) an ionically bonded salt selected from the group consisting of

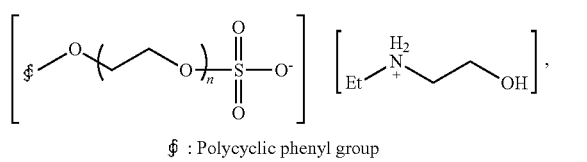
(3)
ⓕ : Polycyclic phenyl group
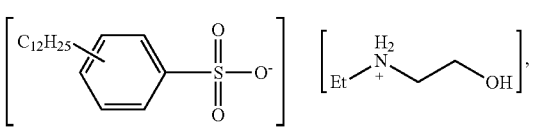
(8)
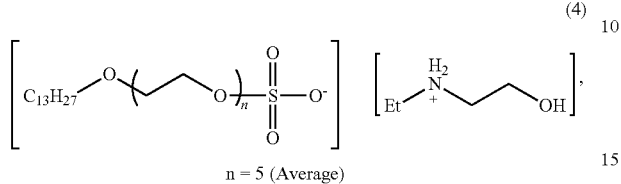
(4)
n = 5 (Average)
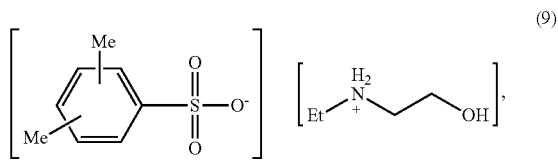
(9)
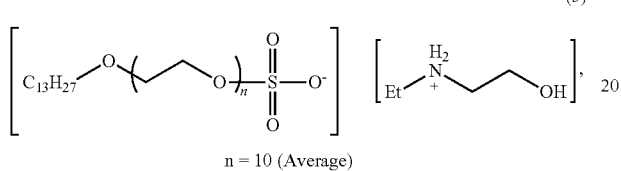
(5)
n = 10 (Average)
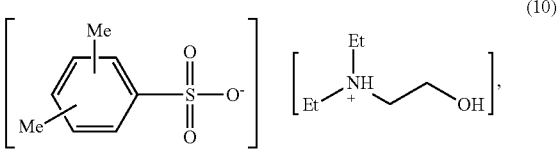
(10)
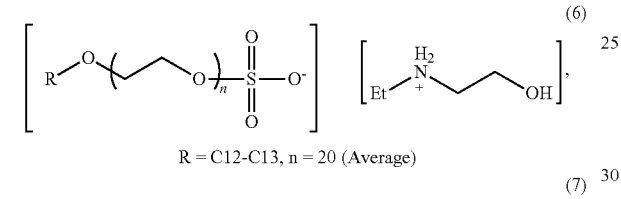
(6)
R = C12-C13, n = 20 (Average)
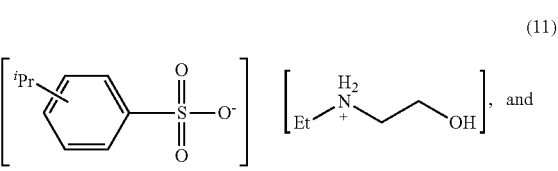
(11), and
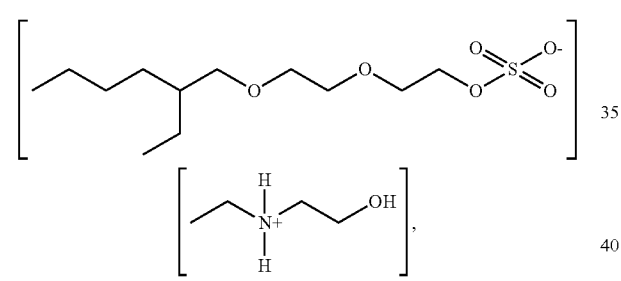
(7)
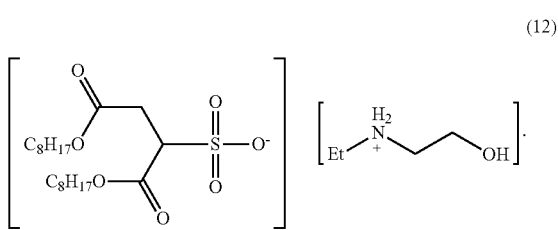
(12).
* * * * *